US012035002B2

(12) United States Patent
Lee

(10) Patent No.: US 12,035,002 B2
(45) Date of Patent: Jul. 9, 2024

(54) APPARATUS AND METHODS FOR DETERMINING THE DEMOGRAPHICS OF USERS

(71) Applicant: The Nielsen Company (US), LLC, New York, NY (US)

(72) Inventor: Morris Lee, Palm Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 9 days.

(21) Appl. No.: 17/566,558

(22) Filed: Dec. 30, 2021

(65) Prior Publication Data

US 2022/0417595 A1 Dec. 29, 2022

Related U.S. Application Data

(60) Provisional application No. 63/214,231, filed on Jun. 23, 2021.

(51) Int. Cl.
*H04N 21/442* (2011.01)
*H04N 21/258* (2011.01)

(52) U.S. Cl.
CPC . *H04N 21/44204* (2013.01); *H04N 21/25883* (2013.01)

(58) Field of Classification Search
CPC ....... H04N 21/44204; H04N 21/25883; H04N 21/251; H04N 21/8352
See application file for complete search history.

(56) References Cited

U.S. PATENT DOCUMENTS

| 8,307,006 B2 | 11/2012 | Hannan et al. |
| 9,210,208 B2 | 12/2015 | Ramaswamy et al. |
| 2016/0066005 A1* | 3/2016 | Davis ............... H04N 21/44008 725/19 |
| 2016/0148232 A1 | 5/2016 | Besehanic |
| 2019/0379933 A1 | 12/2019 | Tapse |

* cited by examiner

*Primary Examiner* — Kunal Langhnoja

(57) ABSTRACT

Methods, apparatus, systems and articles of manufacture are disclosed for determining the demographics of users. An example apparatus includes at least one memory, instructions, and processor circuitry to at least one of execute or instantiate the instructions to extract a first media data pair from first media presentation data from a media provider, identify a second media data pair in second media presentation data based on a comparison of the first media data pair and the second media presentation data, the second media data pair generated in response to a meter accessing streaming data associated with a second media presentation device accessing the streaming media, identify a panelist associated with the second media data pair, and, in response to identifying the panelist, cause a server to associate the second media data pair and demographic data associated with the panelist included in a report by transmitting the report to the server.

20 Claims, 8 Drawing Sheets

APPARATUS AND METHODS FOR DETERMINING THE DEMOGRAPHICS OF USERS

RELATED APPLICATION

This patent arises from an application claiming the benefit of U.S. Provisional Patent Application No. 63/214,231, which was filed on Jun. 23, 2021. U.S. Provisional Patent Application No. 63/214,231 is hereby incorporated herein by reference in its entirety. Priority to U.S. Provisional Patent Application No. 63/214,231 is hereby claimed.

FIELD OF THE DISCLOSURE

This disclosure relates generally to monitoring media and, more particularly, to apparatus and methods for determining the demographics of users.

BACKGROUND

In recent years, methods of accessing media have evolved. For example, Internet media was primarily accessed via computer systems such as desktop and laptop computers. Recently, the advent of smart devices (e.g., smart televisions (TVs), smartphones, and streaming devices such as Roku®, Amazon Fire™ TV Stick, Google Chromecast™, Amazon Fire TV Cube, etc.) has allowed access to Internet media in ways that were previously unavailable.

DETAILED DESCRIPTION

Figure 1:
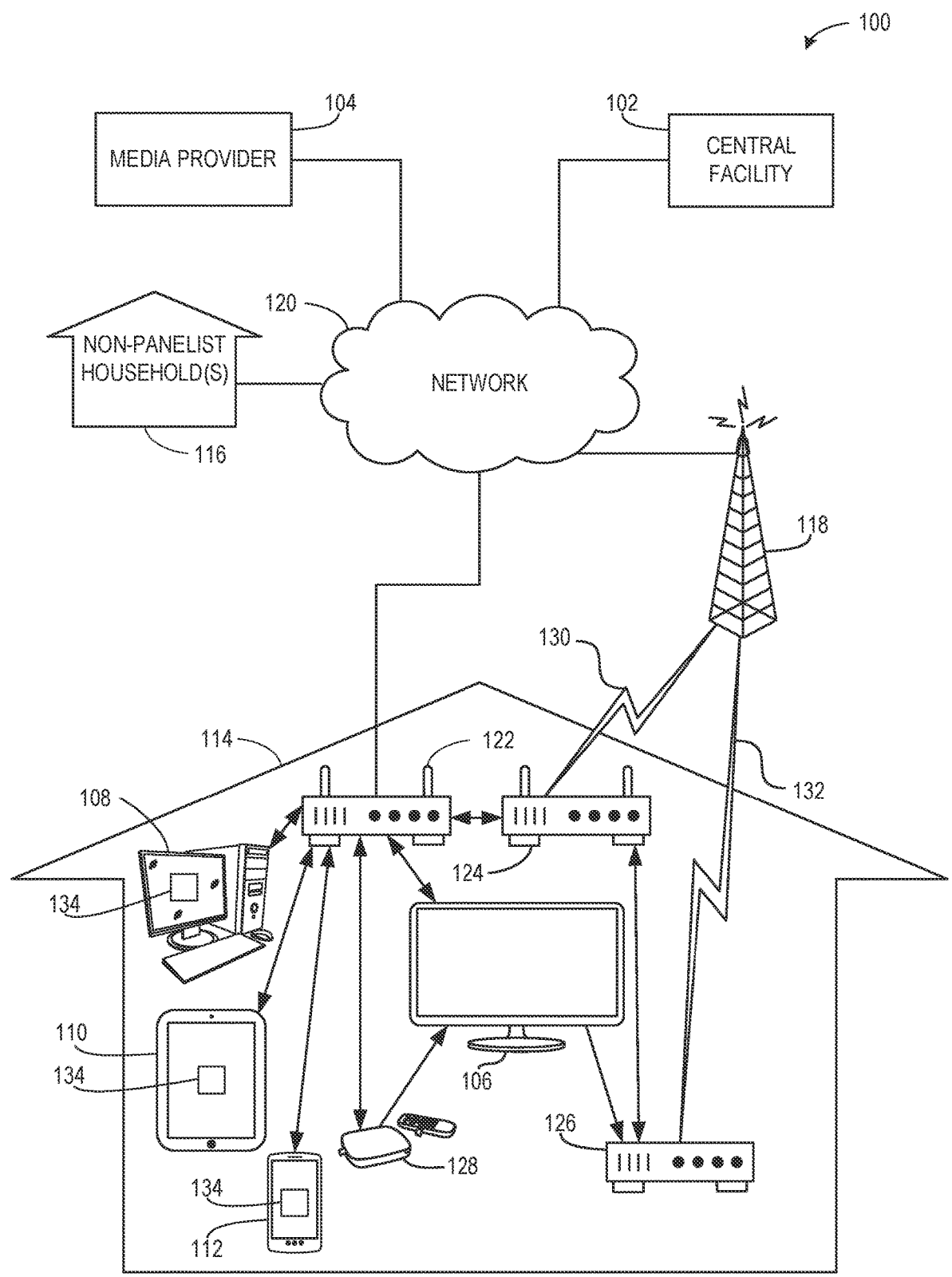
FIG. 1 is a block diagram of an example environment in which an example central facility and an example media provider access streaming traffic data associated with streaming media presented by example media presentation devices.

The figures are not to scale. In general, the same reference numbers will be used throughout the drawing(s) and accompanying written description to refer to the same or like parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

Examples disclosed herein monitor media presentations at media presentation devices. Such media presentation devices may include, for example, Internet-enabled televisions, personal computers, Internet-enabled mobile handsets (e.g., a smartphone), tablet computers (e.g., an iPad®), etc. As used herein, the term "media" includes any type of content and/or advertisement delivered via any type of distribution medium. For example, media may refer to audio and/or visual (still or moving) content and/or advertisements. Thus, media may include television programming, radio programming, movies, web sites, streaming media, etc., and/or advertisements associated with one(s) of the television programming, the radio programming, the movies, the web sites, the streaming media, etc.

In some examples, media may be streamed to the media presentation devices from streaming devices. In some such examples, the media streamed to the media presentation devices may implement streaming media. Some such streaming devices may include, for example, video game consoles (e.g., Xbox®, PlayStation®, Nintendo Switch™, etc.), digital media players (e.g., a Roku Streaming Stick®, a Slingbox®, etc.), etc. In some examples, media monitoring information is aggregated to determine ownership and/or usage statistics of media presentation devices, relative rankings of usage and/or ownership of media presentation devices, types of uses of media presentation devices (e.g., whether a device is used for browsing the Internet, streaming media from the Internet, etc.), and/or other types of media presentation device information.

In examples disclosed herein, monitoring data or information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a user identifier, a panelist identifier, a username, etc.).

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that matched with the monitored signature. Because attributes, such as an identifier of the media, a presentation time, a broadcast channel, etc., are collected for the reference signature, these attributes may then be associated with the monitored media whose monitored signature matched the reference signature.

In recent years, the use of media services (e.g., Netflix™ Hulu™, Prime Video™, HBO GO™, Showtime™, etc.) has moved from almost exclusively on desktop and laptop computers to a wide variety of media presentation devices. Currently, such media services may be accessed through many devices including televisions, smartphones, and streaming devices. Such streaming devices may include a Roku Streaming Stick, Amazon Fire TV Stick, Google Chromecast, Amazon Fire TV Cube, etc. As used herein, the term "streaming" refers to media transmitting directly to a streaming device and the streaming device sending media to a media presentation device.

Typically, media monitoring services would monitor the media streamed to desktop and laptop computers by monitoring the media presentation devices to which the media was being sent. This was fairly simple because there existed direct connectivity between the monitoring device and the media presentation devices. For example, a monitoring device, such as a network meter, monitored a router in a household and the media streaming through the router. This allowed for a relatively simple method of monitoring the media streaming to the laptop or desktop computer because the media monitoring service needed only monitor the network traffic data, such as the uniform resource locator (URL) for the media being presented or the Internet Protocol (IP) address for the media presentation device to which the media was sent. Furthermore, the network traffic data included data packets that were not encrypted and could be used to determine the type of media streaming to the media presentation device.

With the advent of new methods of streaming (e.g., Roku, Amazon Fire TV Stick, Google Chromecast, Amazon Fire TV Cube, etc.), such network traffic data may not clearly represent the media that is streaming. For example, the network traffic data that is accessible by a network meter is generally encrypted with only a few metrics that are not encrypted. These unencrypted metrics do not accurately represent what data is being transferred over the network. For example, a streaming service, such as Netflix, may use content delivery networks, such as Akamai® or Level 3®. In some such examples, a streaming device may request media to stream to a media presentation device. The media that is sent to the streaming device may not be clearly represented by unencrypted metrics of the network traffic data. Because of this unclarity, the network traffic data that is collected by the network meter cannot be used to determine if media is streaming on a media presentation device connected to the network. When the streaming device receives the streaming media from a network device such as a router, and sends it to a media presentation device, it may be unclear whether the media is being presented at all. For example, a Roku stick or a Roku box may connect to the Internet and access media. The media is streamed from a network device (e.g., a router) to the Roku stick or the Roku box. The Roku device is communicatively coupled to a media presentation device (e.g., a television (TV)). The Roku device then renders the media to the TV via a media presentation port such as a High Definition Multimedia Interface (HDMI) port. In this example, because the streaming device (e.g., the Roku device) receives the streaming media via a content delivery network, the unencrypted network traffic data does not clearly represent the streaming media (e.g., Netflix) and cannot be used to determine if media is streaming. Alternatively, a streaming device may send media to a media presentation device via a wireless connection. In this case, the same issue presents itself when trying to identify whether media is streaming based on captured network traffic data.

Other ways in which media may be streamed to a media presentation device include situations in which a streaming device receives media from a network device such as a router. In this example, the streaming device may be a media presentation device, such as a smart phone or a tablet. The smart phone or tablet may then send the media, which it is presenting on itself, to an additional media presentation device such as a television, desktop computer, laptop computer, any other digital display, projector, etc. This is a process commonly referred to as "screen mirroring." Because the media is first being streamed to the smart phone or tablet, the streaming data representing the media being streamed to the additional media presentation device may not be reflective of the media itself. In this example, the media streaming to the additional media presentation device generates a large amount of network traffic data that may be confusing to a media monitoring service when attempting to identify that media is streaming. This excess network traffic data may be characterized as "noise" that presents additional problems when determining whether media is streaming. The term "noise" is used herein to describe interference between network traffic data that is not of interest and network traffic data that is of interest when attempting to use the network traffic data of interest.

These new methods of accessing media on media presentation devices present a problem for media monitoring services. Because the media is sent to streaming devices via network communications that are mostly encrypted, network meters cannot determine the streaming media without the addition of a supplemental meter. Accordingly, audience measurement entities that utilize the data from such network meters may be unable to associate demographics of user(s) presented with the streaming media. Traditionally, a media presentation device meter is used to supplement the network meter in order to identify the media streaming to the media presentation device. With the multiple sources of data, it is possible to identify the streaming media being presented on the media presentation device. However, in presentation environments without supplemental meters, it may not be possible to identify the streaming media being presented on the media presentation device and, thus, may not be possible to associate demographics of a viewer of the streaming media with an access, presentation, etc., of the streaming media.

Prior methods of identifying streaming media being presented on a media presentation device using a network meter required the use of multiple meters to identify the streaming media. In situations where only a network meter is present, prior methods cannot determine the streaming media being presented on the media presentation device because the collected network traffic data does not provide enough information to identify the media. The collected network traffic data alone could represent a number of different tasks being done on a network. For example, a media presentation device may be presenting streaming media being streamed to it. This may be represented in the network traffic data as URLs related to a streaming service. However, with this information alone, a media monitoring service cannot distinguish whether the media presentation device is actually presenting streaming media. Additional media presentation devices such as smartphones, tablets, or computers, may be presenting the streaming media and the collected network traffic data does not clearly represent which media presentation device is presenting the streaming media or whether the streaming media is actually being presented rather than a process related to a streaming media application running the background on a media presentation device.

Examples disclosed herein overcome these aforementioned technical challenges of identifying streaming media and associating demographics of a user with the identified streaming media. In some disclosed examples, an audience measurement entity (AME), such as The Nielsen Company (US), LLC, may obtain data collected by meters (e.g., media presentation device meters, network meters, media meters, people meters, etc.) to determine statistics associated with household behavior in connection with the presentation of media. For example, the AME can obtain first media data (e.g., media presentation data) that includes identifications of media and/or timestamps that correspond to an access of the media, a presentation of the media, etc. In some such examples, the AME can associate the first media data or portion(s) thereof with demographics of the household (e.g., one or more persons residing or visiting the household, one or more panelists of the household, etc.) or person(s) thereof from which the first media data is generated.

In some disclosed examples, the AME can obtain second media data from a media provider (e.g., a streaming media provider). For example, the media provider can obtain the second media data from a streaming device, a streaming media application executing on a media presentation device, etc. In some such examples, the AME can extract media data pairs from the second media data. For example, the media data pairs can include identifications of media (e.g., streaming media) and timestamps that correspond to an access of the media (e.g., the streaming media) by the streaming device, the streaming media application, etc. In some such examples, the AME can determine a probability associated with whether one(s) of the media data pairs are associated with one or more known persons (e.g., a panelist, a resident of a panelist household, etc.), one or more known households (e.g., panelist households), etc. Advantageously, in some disclosed examples, in response to determining that the probability satisfies a threshold (e.g., a probability threshold, a panelist identification threshold, etc.), the AME can associate one(s) of the media data pairs of the second media data with demographics of the one or more known persons, the one or more known households, etc. Advantageously, examples disclosed herein can identify demographics of a user accessing and/or being presented with streaming media based on associating and/or otherwise correlating different media data, which may be in different data formats, and which may be obtained from different hardware (e.g., a streaming media device, a router, a meter, etc.).

By way of example, an AME may have a panel including 20,000 homes from a total of 120 million TV homes. Each of the 20,000 homes may have one or more meters to identify media such as a media meter, a media presentation device meter, a network meter, a people meter, a software meter, etc. In this example, a media provider may provide to the AME media presentation data on 700,000 homes of which the media provider provides media to. In this example, the media presentation data may include media identifiers and corresponding timestamps, but may not include user identifying information such as Internet Protocol (IP) addresses. In this example, the AME panel (e.g., 20,000 homes) and the media provider sample (e.g., 700,000 homes) may have over 100 homes in common. For example, in response to receiving a minimal quantity of data per home, such as four media identifier/timestamp pairs, the AME may identify a common home between the AME panel and the media provider sample with substantial accuracy (e.g., 98% accuracy, 99% accuracy, 99.5% accuracy, etc.) or may identify a non-common home with substantial accuracy (e.g., 98% accuracy, 99% accuracy, 99.5% accuracy, etc.). Advantageously, examples disclosed herein may identify the overlapping homes without user identifying information. Advantageously, examples disclosed herein may identify demographic data associated with the overlapping homes or panelist(s) associated thereof to improve data associations in connection with the overlapping homes.

FIG. 1 is a block diagram of an example environment 100 in which an example central facility 102 and an example media provider 104 access streaming traffic data associated with streaming media presented by example media presentation devices 106, 108, 110, 112. The example environment 100 includes the central facility 102, the media provider 104, an example media exposure measurement location 114, example non-panelist home(s) 116, an example wireless communication system 118, and an example network 120. The media exposure measurement location 114 includes the media presentation devices 106, 108, 110, 112, an example network device 122, an example network meter 124, an example media presentation device meter 126, and an example streaming device 128.

In the illustrated example of FIG. 1, the network 120 is communicatively coupled to the wireless communication system 118 and one(s) of the media presentation devices 106, 108, 110, 112 in the media exposure measurement location 114. In this example, the central facility 102 and the media provider 104 are communicatively coupled to the network 120. The wireless communication system 118 is communicatively coupled to the network 120 and one(s) of the media presentation devices 106, 108, 110, 112 in the media exposure measurement location 114. The wireless communication system 118 is communicatively coupled to one(s) of the media presentation devices 106, 108, 110, 112 in the media exposure measurement location 114 by an example network meter communication link 130 and/or an example media presentation device meter communication link 132.

In the illustrated example of FIG. 1, the media provider 104 corresponds to any one or more media provider(s) capable of providing media for presentation via one(s) of the media presentation devices 106, 108, 110, 112. For example, the media provider 104 can be implemented by any provider(s) of media such as a digital broadcast provider (e.g., a cable television service, fiber-optic television service, etc.) and/or an on-demand digital media provider (e.g., an Internet streaming video and/or audio service such as Amazon Prime Video®, Apple Music®, Apple TV®, AT&T TV®, Discovery+®, Disney+®, fuboTV®, Netflix®, Hulu®, HBO Max®, iflix, iQIYI®, Last.fm®, Pandora®, Paramount+®, Peacock®, Philo®, Showtime®, Sling TV®, Spotify®, Starz®, Tencent Video, Youku®, YouTube®, YouTube TV®, etc.) and/or any other provider of streaming media services. In some examples, the media provider 104 may implement a host for web site(s). Additionally or alternatively, the media provider 104 may not be on the Internet. For example, the media provider 104 may be on a private and/or semi-private network (e.g., a local area network (LAN), a virtual private network (VPN), etc.) to which one(s) of the media presentation device 106, 108, 110, 112 connect.

In this example, the media presentation devices 106, 108, 110, 112 are devices that retrieve media from the media provider 104. The media presentation devices 106, 108, 110, 112 include a first example media presentation device 106, a second example media presentation device 108, a third example media presentation device 110, and a fourth example media presentation device 112. In this example, the first media presentation device 106 is a television (e.g., a smart television, an Internet-enabled television, etc.). In this example, the second media presentation device 108 is a desktop computer (e.g., a desktop tower and one or more display monitors). In this example, the third media presentation device 110 is a tablet (e.g., a tablet computer, an Internet-enabled tablet, etc.). In this example, the fourth media presentation device 112 is a phone (e.g., a smartphone, an Internet-enabled smartphone, etc.). One(s) of the media presentation devices 106, 108, 110, 112 may present media sent from the streaming device 128 via a wired or wireless connection to the streaming device 128, a wired or wireless connection to the media provider 104, etc. In some examples, one(s) of the media presentation devices 106, 108, 110, 112 may present the media streaming to it/them from the streaming device 128 with supplementary media presentation devices such as speakers, projectors, additional screens, etc.

The media exposure measurement location 114 of the illustrated example of FIG. 1 is a panelist household. However, the media exposure measurement location 114 may be any other location, such as, for example, an Internet café, an office, an airport, a library, a non-panelist household, etc. While in the illustrated example a single media exposure measurement location 114 is shown, any number and/or type(s) of media exposure measurement locations may be used.

The panelist household may include one or more panelists. The panelists are users registered on panels maintained by a ratings entity (e.g., an audience measurement entity (AME), an audience measurement company, etc.) that owns and/or operates the ratings entity subsystem. Traditionally, AMEs (also referred to herein as "ratings entities") determine demographic reach for advertising and media programming based on registered panel members. That is, an AME enrolls people that consent to being monitored into a panel. During enrollment, the AME receives demographic information from the enrolling people so that subsequent correlations may be made between advertisement/media exposure to those panelists and different demographic markets.

People (e.g., households, organizations, etc.) register as panelists via, for example, a user interface presented on a media device (e.g., via a website). For example, a person can register as a panelist using one(s) of the media presentation devices 106, 108, 110, 112. People may be recruited as panelists in additional or alternative manners such as, for example, via a telephone interview, by completing an online survey, etc. Additionally or alternatively, people may be contacted and/or enlisted to join a panel using any desired methodology (e.g., random selection, statistical selection, phone solicitations, Internet advertisements, surveys, advertisements in shopping malls, product packaging, etc.).

In contrast to such panelist households, the non-panelist household(s) 116 of FIG. 1 may retrieve and present media from the media provider 104 without being monitored via participation in a panel. For example, the non-panelist household(s) 116 may include one or more persons, one or more media presentation devices (e.g., one(s) of the media presentation devices 106, 108, 110, 112), one or more streaming devices (e.g., the streaming device 128), etc., and/or a combination thereof. Alternatively, one(s) of the non-panelist household(s) may be an Internet café, an office, an airport, a library, etc.

Returning to the illustrated example of FIG. 1, the network device 122 is communicatively coupled to one or more of a plurality of devices in the media exposure measurement location 114. For example, the network device 122 is communicatively coupled to the first media presentation device 106, the second media presentation device 108, the third media presentation device 110, the fourth media presentation device 112, the network meter 124, and the streaming device 128. The network meter 124 is communicatively coupled to the network device 122 and the media presentation device meter 126. The network meter 124 is communicatively coupled to the wireless communication system 118 by the network meter communication link 130. The media presentation device meter 126 is communicatively coupled to the first media presentation device 106 and the network meter 124. The media presentation device meter 126 is communicatively coupled to the wireless communication system 118 by the media presentation device meter communication link 132. The streaming device 128 is communicatively coupled to the first media presentation device 106 and the network device 122. The first media presentation device 106 is communicatively coupled to the network device 122, the media presentation device meter 126, and the streaming device 128.

The network device 122 of the illustrated example of FIG. 1 is a router that enables one(s) of the media presentation devices 106, 108, 110, 112 in the media exposure measurement location 114 to communicate with the network 120. In some examples, the network device 122 includes gateway functionality such as modem capabilities. In some examples, the network device 122 is implemented with two or more devices (e.g., a router, a modem, a switch, a firewall, etc., and/or a combination thereof). In this example, the network 120 is the Internet. However, the network 120 may be implemented using any suitable wired and/or wireless network(s) including, for example, one or more LANs, one or more wireless local area networks (WLANs), one or more cellular networks, one or more private networks, one or more public networks, etc.

The network meter 124 of the illustrated example of FIG. 1 is a device (e.g., a metering device) that monitors the network traffic data flowing through the network device 122. In some examples, the network meter 124 may be implemented as a single home unit and may have the functionality to collect network traffic data streaming on the network device 122. In some examples, the network meter 124 may be configured to communicate with other devices in the media exposure measurement location 114 such as, for example, the media presentation device meter 126 and the streaming device 128. In some examples, the network meter 124 may be configured to collect additional network traffic data related to the type of media being streamed to one(s) of the media presentation devices 106, 108, 110, 112 after receiving the notification from the one(s) of the media presentation devices 106, 108, 110, 112. In some examples, the network meter 124 may be configured to query devices in the media exposure measurement location 114 to determine information on active applications, processes, services, etc., running on the other devices in the media exposure measurement location 114. For example, the network meter 124 can query the streaming device 128 to determine the active application running on the streaming device 128. In some examples, the network meter 124 may be configured to communicate with the central facility 102 via the network device 122. In some examples, the network meter 124 may transmit the network traffic data and the information determined in querying the other devices in the media exposure measurement location 114 to the central facility 102. For example, the network meter 124 can transmit media presentation data to the central facility 102. In some such examples, the media presentation data can include data associated with a presentation of media, such as streaming media, on one(s) of the media presentation devices 106, 108, 110, 112. In some such examples, the media presentation data can include identifications of the media (e.g., a name of a song or video, a name of a television series or movie, a name and/or number of an episode of the television series, a timestamp of the episode or the movie being accessed, a provider of the television series or movie, an artist of the song, etc.), a timestamp (e.g., a second, minute, and/or hour of a day and/or a day, month, and/or year at which the media is accessed, downloaded, and/or stored in memory), etc., and/or a combination thereof.

The media presentation device meter 110 of the illustrated example of FIG. 1 is a device (e.g., metering device) that meters the media being presented on one(s) of the media presentation devices 106, 108, 110, 112. In some examples, the media presentation device meter 126 may be configured to collect streaming data associated with the media being streamed to the one(s) of the media presentation devices 106, 108, 110, 112. Streaming data may include, for example, signatures, watermarks, timestamps associated with media access, identifications of media, or other metering metrics related to the streaming media on the one(s) of the media presentation devices 106, 108, 110, 112. In some examples, the media presentation device meter 126 may be configured to generate audio signatures and/or video signatures and/or extract audio and/or video watermarks from the audio and video output of the media being presented by the first media presentation device 106. For example, the audio output of the first media presentation device 106 may be processed to detect audio codes and/or generate audio signatures for the streaming media. The video output of the first media presentation device 106 may be processed to generate video signatures of the streaming media.

In some examples, the media presentation device meter 126 of FIG. 1 may be configured to detect the streaming device 128 that the media is being streamed from. With the collected and/or generated and/or extracted streaming data, the media presentation device meter 126 may generate a monitoring report including an identification of the media being streamed, the identity of the streaming device 128 streaming the media, and/or a timestamp associated with an access and/or presentation of the media. In some examples, the media presentation device meter 126 may be configured to transmit the monitoring report to the central facility 102 via a connection with the network device 122. In some examples, the media presentation device meter 126 may be configured to communicate with the network meter 124 to transmit the monitoring report from the media presentation device meter 126 to the network meter 124. In some examples, the monitoring report may include and/or otherwise indicate a variety of other metrics about either the streaming device 128, one(s) of the media presentation devices 106, 108, 110, 112, and/or demographics associated with a user of the one(s) of the media presentation devices 106, 108, 110, 112.

In some examples, the network meter 124 and the media presentation device meter 126 may be unable to transmit information to the central facility 102 via the network device 122. For example, a server upstream of the network device 122 may not provide functional routing capabilities to the central facility 102. In the illustrated example of FIG. 1, the network meter 124 can implement capabilities to send information through the wireless communication system 118 (e.g., the cellular communication system) via the network meter communication link 130. In some examples, the media presentation device meter 126 can implement capabilities to send information through the wireless communication system 118 via the media presentation device meter communication link 132.

The network meter communication link 130 and/or the media presentation device meter communication link 132 of the illustrated example of FIG. 1 is/are cellular communication links. However, any other technique and/or system of communication may additionally or alternatively be used such as, for example, an Ethernet connection, a Bluetooth® connection, a wireless fidelity (Wi-Fi) connection, etc. In some examples, the network meter communication link 130 and/or the media presentation device meter communication link 132 can implement a cellular connection via a Global System for Mobile Communications (GSM). However, any other systems and/or protocols for communication may be used such as, for example, Time Division Multiple Access (TDMA), Code Division Multiple Access (CDMA), Worldwide Interoperability for Microwave Access (WiMAX), Long term Evolution (LTE), etc.

The streaming device 128 of the illustrated example of FIG. 1 is a device that retrieves media from a service provider, such as the media provider 104, for presentation (e.g., to a user, viewer, etc.). In some examples, the streaming device 128 is capable of sending the retrieved media to a media presentation device, such as the first media presentation device 106. In some such examples, the media may be sent via a wired or wireless connection to the first media presentation device 106. In some such examples, the streaming device 128 may implement one or more digital media players (e.g., a Roku media player, an Amazon Fire TV Stick, a Google Chromecast, Amazon Fire TV Cube, a Slingbox, etc.), one or more video game consoles (e.g., Xbox, PlayStation), etc.

In some examples, the streaming device 128 generates media data (e.g., media presentation data) and transmits the media data to the media provider 104 in response to a presentation of media on a media presentation device, such as one(s) of the media presentation devices 106, 108, 110, 112. For example, the streaming device 128 can stream media to the first media presentation device 106. In some such examples, in response to the streaming device 128 streaming the media to the first media presentation device 106, the streaming device 128 can generate media data, such as an identification of the media and/or a timestamp at which the media is streamed to the first media presentation device 106. In some such examples, the streaming device 128 can transmit the media data to the media provider 104 via the network device 122 and the network 120. As described in further detail below, the media provider 104 can receive the media data from the streaming device 128 and transmit the media data to the central facility 102 to determine whether the media data is associated with a panelist.

In the illustrated example of FIG. 1, the second media presentation device 108, the third media presentation device 110, and the fourth media presentation device 112 include an example software meter 134 to monitor streaming media presentation on such device(s). For example, the second media presentation device 108, the third media presentation device 110, and the fourth media presentation device 112 may execute a streaming media application (e.g., software that implements the streaming device 128, Amazon Prime Video®, Apple Music®, Netflix®, YouTube®, Hulu®, Pandora®, Spotify®, Last.fm®, etc.). In some examples, the software meter 134 may be implemented by an application, a script, etc., on the second media presentation device 108, the third media presentation device 110, and/or the fourth media presentation device 112 that, when executed, obtains media data (e.g., media presentation data) associated with the presentation of media on such device(s). For example, the software meter 134 may generate media presentation data including an identification of media being presented on a respective one of the media presentation devices 108, 110, 112.

In some examples, the software meter 134 may display a graphical user interface (GUI) where a panelist, a user, etc., may identify who is being exposed to presented media. In some such examples, the panelist, the user, etc., may input geodemographic data (e.g., a geographic location of the media exposure measurement location 114, age(s) of the panelist(s) associated with the media exposure measurement location 114, a gender of a panelist, an income level of a panelist, etc.). In some examples, the software meter 134 may implement a network monitoring media meter operating on the second media presentation device 108, the third media presentation device 110, and/or the fourth media presentation device 112. Additionally or alternatively, one or more of the example network meter 124, the media presentation device meter 126, and/or the software meter 134 may be a different type of metering device or implementation, such as a people meter, a media meter, a streaming media meter, etc.

In some examples, the software meter 134 of the illustrated example determines aspects of audience configuration (e.g., which household member(s) are currently watching a specified portion of media, the corresponding demographics of that household member, an exposure time for the specified portion of the media, etc.). In some examples, the software meter 134 captures a timestamp at which media is accessed, a number of exposure minutes, a number of impressions, and/or demographics of a panelist. In some examples, the software meter 134 may capture information about the household audience by prompting the audience member(s) via the GUI on the second media presentation device 108, the third media presentation device 110, and/or the fourth media presentation device 112 to indicate that they are present during media presentation by, for example, selecting their assigned identifier on the GUI of the software meter 134. When a member of the household selects their corresponding identifier, the example software meter 134 identifies which household member is present, and associates demographic information associated with the household member, such as a name, a gender, an age, an income category, etc., with the media presentation. In some examples, a guest accompanying the member of the household generates a guest identifier including demographics corresponding to the guest via the GUI of the software meter 134.

In the illustrated example of FIG. 1, the central facility 102 is an AME that collects and processes media monitoring information, media presentation information, etc., from meter(s), such as from one(s) of the network meter 124, the media presentation device meter 126, the software meter 134, etc., to generate exposure metrics related to presented media. In some examples, the central facility 102 may be implemented by one or more servers to obtain data from the media exposure measurement location 114 via the network 120 and generate the exposure metrics based on the obtained data. The central facility 102 may store the media monitoring information, the media presentation information, etc., or portion(s) thereof.

In the illustrated example, the central facility 102 identifies a panelist, such as a panelist of the media exposure measurement location 114, associated with one or more accesses of media streamed from the media provider 104. For example, the central facility 102 can obtain first media presentation data from at least one of the network meter 124, the media presentation device meter 126, or the software meter 134 of the media exposure measurement location 114. In some such examples, the central facility 102 can extract portion(s) of data, such as an identification of accessed streaming media and/or a timestamp corresponding to a presentation of the accessed streaming media, from the first media presentation data. In some examples, the central facility 102 can obtain second media presentation data from the media provider 104 (e.g., via the network 120). In some such examples, the central facility 102 can extract portion(s) of data, such as an identification of accessed streaming media and/or a timestamp corresponding to a presentation of the accessed streaming media, from the second media presentation data.

In some examples, the central facility 102 can determine a probability associated with whether a portion of the second media presentation data corresponds to a panelist based on a portion of the first media presentation data. For example, the central facility 102 can determine whether a first identification of media and a first corresponding timestamp from the media provider 104 matches a second identification of media and a second corresponding timestamp stored in the central facility 102. In some such examples, the probability is based on the matching.

Advantageously, the media provider 104 can provide a minimal number of different types of data, media data, etc., to the central facility 102 and the central facility 102 can identify whether the data is associated with one or more panelists. For example, the central facility 102 can identify with substantially high accuracy (e.g., 90% accuracy, 95% accuracy, 99% accuracy, etc.) that one or more pairs of media data (e.g., media data pairs), such as one or more pairs of media identifications and corresponding timestamps, that the one or more pairs of media data are associated with a panelist managed by the central facility 102. Advantageously, the central facility 102 can provide panelist data to the media provider 104 based on reduced quantities of types of provided data. For example, the central facility 102 can provide geodemographic data associated with a panelist of the media exposure measurement location 114 in response to determining that a portion of data obtained from the media provider 104 corresponds to the panelist. In some such examples, the central facility 102 can transmit a report including the geodemographic data to the media provider 104 to cause the media provider 104 to associate the geodemographic data with the portion of data. In some such examples, the central facility 102 can cause the media provider 104 to associate the geodemographic data with other data managed and/or stored by the media provider 104, such as a user name or other login credentials used to access streaming media services hosted and/or otherwise managed by the media provider 104.

In example operation, a panelist in the media exposure measurement location 114 may access media via the streaming device 128. The streaming device 128 may connect to the network 120 (e.g., the Internet) via the network device 122 and stream media to a media presentation device, such as the first media presentation device 106. The first media presentation device 106 may present the media, for example, the first media presentation device 106 may present the media on a display as well as supplemental media presentation devices (e.g., speakers).

In example operation, the media presentation device meter 126 may monitor the first media presentation device 106 and may collect media presentation data (e.g., streaming data) such as, for example, timestamps and/or watermarks and/or codes and/or signatures for the visual and/or audio media presented on the first media presentation device 106. For example, the media presentation device meter 126 may generate audio signatures and/or video signatures and/or extract audio and/or video watermarks from the audio and/or video output of the media being presented by the first media presentation device 106. The media presentation device meter 126 may process the audio output of the first media presentation device 106 to detect audio codes and/or generate audio signatures for the streaming media. The media presentation device meter 126 may process the video output of the first media presentation device 106 to generate video signatures of the streaming media. The media presentation device meter 126 may be configured to detect the streaming device 128 that the media is being streamed from as well as the type of media being streamed by the streaming device 128 and notify the network meter 124.

In example operation, the media presentation device meter 126 may generate a report (e.g., a monitoring report, a media monitoring report, a media presentation report, etc.) based on the collected data that includes the media being streamed, a timestamp at which the media is streamed, and/or the identity of the streaming device 128 streaming the media. The media presentation device meter 126 may be configured to transmit the report to the central facility 102 via a connection with the network device 122 and/or via the media presentation device meter communication link 132. The media presentation device meter 126 may store the collected streaming data and/or the reports before transmitting the information to the central facility 102.

In example operation, after receiving, at the central facility 102, the streaming data and/or report from the media presentation device meter 126 (and/or from the network meter 124 and/or the software meter 134), the central facility 102 may determine whether media presentation data from the media provider 104 is associated with a panelist. Advantageously, in example operation, the central facility 102 may improve data storage efficiency of the media provider 104 by enhancing information about their users with additional information, such as geodemographic data.

Advantageously, the media provider 104 can improve their products, such as the streaming device 128, based on the additional information obtained from the central facility 102. For example, the media provider 104 can correlate data about users of services provided by the media provider 104 with factors such as geodemographic data (e.g., a geographic location of the media exposure measurement location, age(s) of the panelist(s) associated with the media exposure measurement location, an income level of a panelist, etc.). The media provider 104 may utilize such factors to determine which features of their hardware, software, and/or firmware (e.g., hardware, software, and/or firmware of the streaming device 128) should be improved, determine which features are popular among users, identify geodemographic trends with respect to the streaming device 128, identify market opportunities, and/or otherwise evaluate their own technical products.

Figure 2:
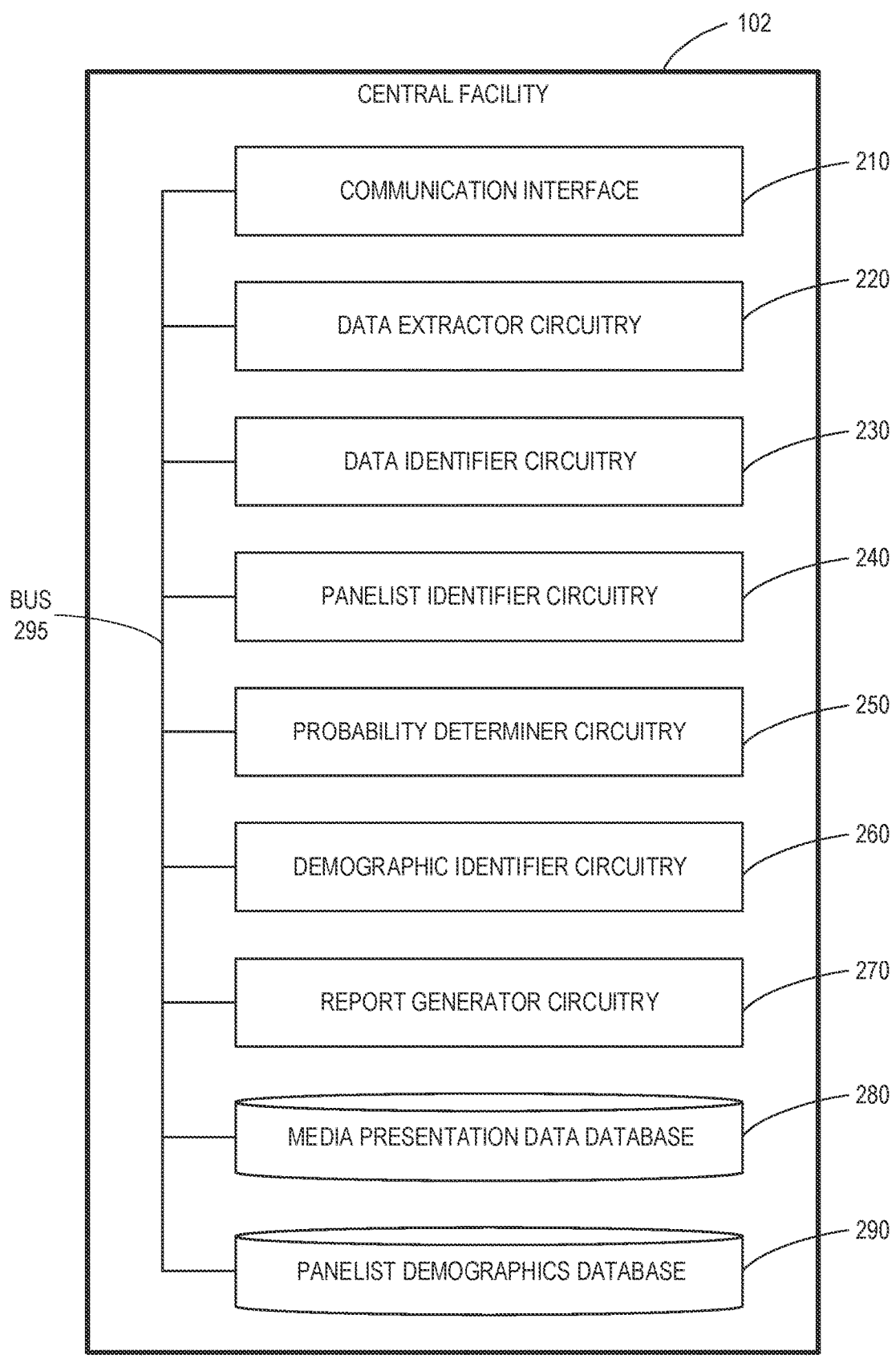
FIG. 2 is a block diagram of an example implementation of the example central facility of FIG. 1.

FIG. 2 is a block diagram of an example implementation of the example central facility 102 of FIG. 1. In the illustrated example of FIG. 2, the central facility 102 includes an example communication interface 210, an example data extractor circuitry 220, an example data identifier circuitry 230, an example panelist identifier circuitry 240, an example probability determiner 250, an example demographic identifier circuitry 260, an example report generator 270, an example media presentation data database 280, an example panelist demographics database 290, and an example bus 295.

In the illustrated example of FIG. 2, the communication interface 210, the data extractor circuitry 220, the data identifier circuitry 230, the panelist identifier circuitry 240, the probability determiner circuitry 250, the demographic identifier circuitry 260, the report generator circuitry 270, the media presentation data database 280, and the example panelist demographics database 290 are in communication with one(s) of each other via the bus 295. In some examples, the bus 295 implements at least one of an Inter-Integrated Circuit (I2C) bus, a Serial Peripheral Interface (SPI) bus, or a Peripheral Component Interconnect (PCI) bus. Additionally or alternatively, the bus 295 may implement any other type of computing or electrical bus.

In the illustrated example of FIG. 2, the central facility 102 includes the communication interface 210 to obtain information from and/or transmit information to a network, such as the network 120 of FIG. 1. In some examples, the communication interface 210 implements a server (e.g., a web server) that receives media presentation data from the media provider 104. In some examples, the communication interface 210 implements a server (e.g., a web server) that receives media presentation data from the network device 122, the network meter 124, and/or the media presentation device meter 126 from one or more media exposure measurement locations, such as the media exposure measurement location 114 of FIG. 1. In some examples, the media presentation data is formatted as one or more HTTP messages. However, any other message format and/or protocol may additionally or alternatively be used such as, for example, a file transfer protocol (FTP), a simple message transfer protocol (SMTP), an HTTP secure (HTTPS) protocol, etc.

In some examples, the central facility 102 includes means for obtaining media presentation data from a media provider, such as the media provider 104 of FIG. 1. For example, the means for obtaining may implemented by the communication interface 210. In some examples, the communication interface 210 is to determine whether additional media presentation data has been obtained. In some examples, the communication interface 210 may be implemented by machine executable instructions such as that implemented by at least blocks 302 and 320 of FIG. 3. In other examples, the communication interface 210 is implemented by hardware logic, hardware implemented state machines, logic circuitry, and/or any other combination of hardware, software, and/or firmware. For example, the communication interface 210 may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, a network interface card (NIC), an interface circuit, etc.) structured to perform the corresponding operation without executing software or firmware, but other structures are likewise appropriate.

In the illustrated example of FIG. 2, the central facility 102 includes the data extractor circuitry 220 to extra portion(s) (e.g., data portion(s)) of media presentation data. In some examples, the data extractor circuitry 220 extracts media data pairs from media presentation data. For example, the data extractor circuitry 220 can extract a pair of data values, such as a media identifier of streaming media and a timestamp that corresponds to an access and/or presentation of the streaming media by a media presentation device (e.g., one(s) of the media presentation device(s) 106, 108, 110, 112 of FIG. 1). In some such examples, the data extractor circuitry 220 can extract multiple media data pairs (e.g., two media data pairs, four media data pairs, eight media data pairs, etc.). Advantageously, the data extractor circuitry 220 may extract a reduced number of media data pairs to effectuate the panelist identifier circuitry 240 identifying a panelist associated with the reduced number of media data pairs. For example, the data extractor circuitry 220 can select media presentation data from the media provider 104 to process. In some such examples, the data extractor circuitry 220 can extract four media data pairs from the media presentation data that may be utilized by the panelist identifier circuitry 240 to identify one or more panelists, one or more panelist households, etc., that correspond to one or more of the extracted four media data pairs.

In some examples, the central facility 102 includes means for extracting a first media data pair from first media presentation data obtained from a media provider, such as the media provider 104 of FIG. 1. For example, the means for extracting may be implemented by the data extractor circuitry 220. In some such examples, the first media presentation data is generated in response to one(s) of the media presentation devices 106, 108, 110, 112 of FIG. 1 accessing streaming media provided by the media provider 104. In some such examples, the first media data pair includes first data and second data, the first data including an identification of the streaming media, the second data including a timestamp corresponding to an access of the streaming media. In some examples, the data extractor circuitry 220 may be implemented by executable instructions such as that implemented by at least block 304 of FIG. 3. In other examples, the data extractor circuitry 220 is implemented by hardware logic, hardware implemented state machines, logic circuitry, and/or any other combination of hardware, software, and/or firmware. For example, the data extractor circuitry 220 may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 2, the central facility 102 includes the data identifier circuitry 230 to identify portion(s) of media presentation data in a database. In some examples, the data identifier circuitry 230 identifies media data pairs in the media presentation data database 280. For example, the data identifier circuitry 230 can select a set of media data pairs to process. In some such examples, the set (e.g., the media data pair set) may include one or more media data pairs (e.g., a first media data pair, a second media data pair, etc.). In some such examples, the data identifier circuitry 230 can obtain a first media data pair, which can include a first media identifier and a first timestamp, from the data extractor circuitry 220, which may extract the first media data pair from media presentation data obtained from the media provider 104.

In some examples, the data identifier circuitry 230 queries the media presentation data database 280 with the first media identifier, the first timestamp, and/or, more generally, the first media data pair, to determine whether the first media identifier, the first timestamp, and/or, more generally, the first media data pair, is stored in the media presentation data database 280. In some such examples, the data identifier circuitry 230 can determine whether a match has been found based on the querying and/or the comparisons of the first media identifier, the first timestamp, and/or, more generally, the first media data pair, with data stored in the media presentation data database 280. In some such examples, in response to determining that a match has not been found (e.g., the first media identifier, the first timestamp, and/or, more generally, the first media data pair, is not stored in the media presentation data database 280), then the data identifier circuitry 230 can determine whether to select another media data pair of the set to process, such as a second media data pair, which may include a second media identifier and a second timestamp.

In some examples, in response to determining that one or more matches have been found (e.g., the first media identifier, the first timestamp, and/or, more generally, the first media data pair, are stored in the media presentation data database 280), then the data identifier circuitry 230 can compare associated media data pairs of the match in the media presentation data database 280. For example, the data identifier circuitry 230 can determine whether the match is associated with an access and/or presentation of media that generated other media data pairs (or portion(s) thereof). In some such examples, the first media presentation device 106 can present media, which may cause the generation of the matching media data pair (e.g., a first matching media data pair generated at a first time), and the other media data pairs (e.g., a first associated media data pair generated at a second time after the first time, a second associated media data pair generated at a third time after the second time, etc.) may be generated in response to the continued presentation of the media. For example, the data identifier circuitry 230 can identify whether the matching data, which may include the first media identifier and/or the first timestamp, has associated data stored in the media presentation data database 280. In some such examples, the associated data can correspond to one or more media identifiers that are the same as or are substantially the same as the first media identifier, one or more timestamps that correspond to the one or more media identifiers, etc. For example, the associated data can include a first associated media identifier identifying media and a first timestamp that corresponds to an access and/or presentation of the media, a second associated media identifier identifying the media and a second timestamp that corresponds to an access and/or presentation of the media, etc.

Advantageously, the data identifier circuitry 230 may compare the first media data pair (or portions(s) thereof) to a subset of relevant, associated data (e.g., the first associated media data pair, the second associated media data pair, etc.) of the media presentation data database 280 rather than an entirety of the media presentation data database 280. Advantageously, the reduction in the data to be searched can improve searching efficiency and a reduction in computational resources (e.g., compute and/or processor resources, memory resources, etc.) needed to identify media data pairs of interest for analysis and processing as described herein.

In some examples, the central facility 102 includes means for identifying (e.g., first means for identifying) a second media data pair in second media presentation data based on a comparison of a first media data pair and the second media presentation data. For example, the means for identifying may be implemented by the panelist identifier circuitry 230. In some such examples, the second media data pair is generated in response to a meter accessing streaming data associated with a second media presentation device accessing the streaming media. In some examples in which the first media data pair is associated with a third media data pair included in the first media presentation data, the panelist identifier circuitry 230 is to, in response to a query of a database with the first media data pair, determine whether the first media data pair matches the second media data pair, the database to store the second media presentation data, and response to a determination that the first media data pair matches the second media data pair, identify a fourth media data pair associated with the second media data pair, the fourth media data pair stored in the database.

Figure 3:
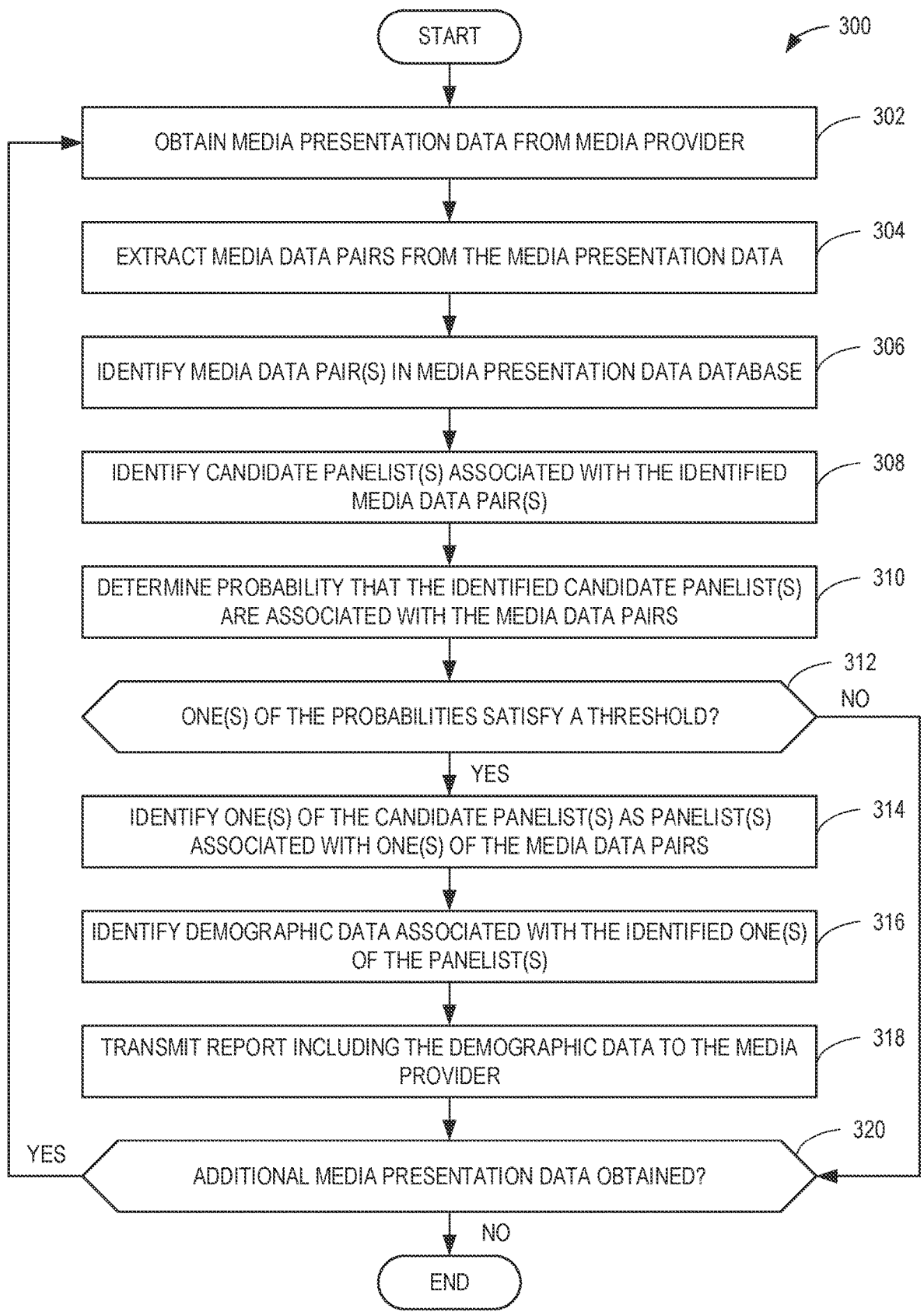
FIG. 3 is a flowchart representative of example machine readable instructions that may be executed to implement the example central facility of FIGS. 1 and/or 2 to identify demographic data associated with a panelist.
Figure 4:
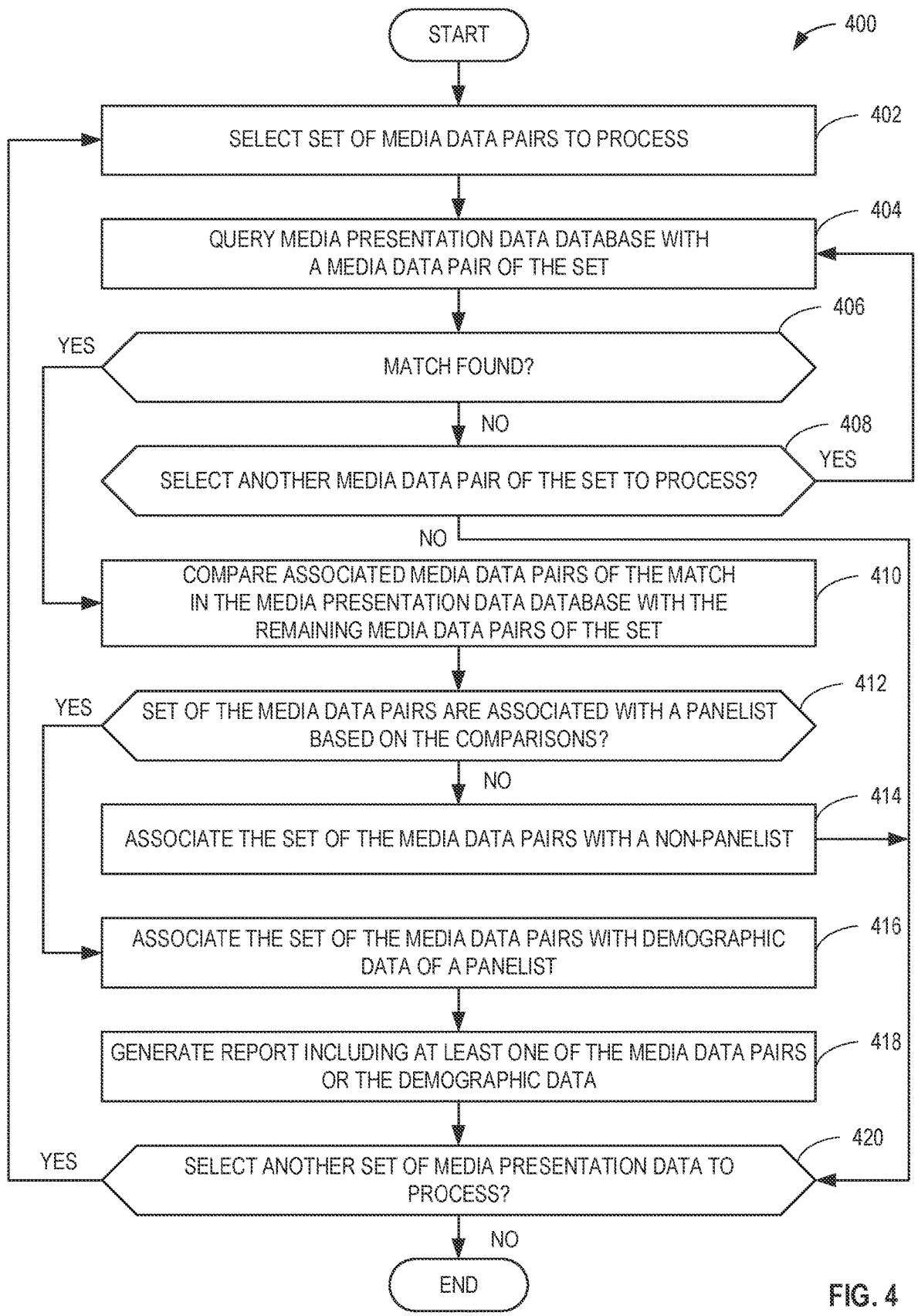
FIG. 4 is another flowchart representative of example machine readable instructions that may be executed to implement the example central facility of FIGS. 1 and/or 2 to identify demographic data associated with a panelist.

In some examples, the data identifier circuitry 230 may be implemented by machine executable instructions such as that implemented by at least block 306 of FIG. 3 and/or blocks 402, 404, 406, 408, 410, and 420 of FIG. 4. In other examples, the data identifier circuitry 230 is implemented by hardware logic, hardware implemented state machines, logic circuitry, and/or any other combination of hardware, software, and/or firmware. For example, the data identifier circuitry 230 may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 2, the central facility 102 includes the panelist identifier circuitry 240 to identify a panelist associated with media presentation data obtained from the media provider 104. In some examples, the panelist identifier circuitry 240 identifies candidate panelist(s) associated with one or more media data pairs included in media presentation data obtained from the media provider 104. In some examples, the panelist identifier circuitry 240 identifies one(s) of the candidate panelist(s) as panelist(s) based on a probability threshold being satisfied. For example, the probability determiner circuitry 250 as described below can determine a probability corresponding to a likelihood that one or more media data pairs are associated with a candidate panelist, such as a panelist in the media exposure measurement location 114 of FIG. 1. In some such examples, the panelist identifier circuitry 240 determines whether the probability is greater than a threshold and, thus, satisfies the threshold.

In some examples, in response to determining that the probability satisfies the threshold, the panelist identifier circuitry 240 can identify the candidate panelist as a panelist associated with the one or more media data pairs. In some examples, in response to determining that the probability does not satisfy the threshold, the panelist identifier circuitry 240 can identify the one or more media data pairs as being associated with a non-panelist, such as a person, a media presentation device, etc., associated with one(s) of the non-panelist household(s) 116 of FIG. 1. In some examples, in response to determining that one or more media data pairs are not stored in the media presentation data database 280, the panelist identifier circuitry 240 can identify the one or more media data pairs as being associated with a non-panelist, such as a person, a media presentation device, etc., associated with one(s) of the non-panelist household(s) 116 of FIG. 1.

In some examples, the central facility 102 includes means for identifying (e.g., second means for identifying) a panelist associated with a second media data pair (e.g., a media data pair obtained from the media provider 104). For example, the means for identifying may be implemented by the panelist identifier circuitry 240. In some examples, the panelist identifier circuitry 240 is to identify a candidate panelist based on a match of a first media data pair and the second media data pair. In some examples, the panelist identifier circuitry 240 is to, in response to a determination that a probability satisfies a threshold, identify the candidate panelist as the panelist. In some examples, the panelist identifier circuitry 240 is to identify the candidate panelist as a non-panelist in response to a determination that the first media data pair does not match the second media data pair.

In some examples, the panelist identifier circuitry 240 may be implemented by executable instructions such as that implemented by at least blocks 308, 312, and 314 of FIG. 3 and/or blocks 412 and 414 of FIG. 4. In other examples, the panelist identifier circuitry 240 is implemented by hardware logic, hardware implemented state machines, logic circuitry, and/or any other combination of hardware, software, and/or firmware. For example, the panelist identifier circuitry 240 may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 2, the central facility 102 includes the probability determiner circuitry 250 to calculate and/or otherwise determine a probability that a candidate panelist is a panelist associated with one or more media data pairs. For example, the probability determiner circuitry 250 can determine a probability to indicate a likelihood of whether a first media data pair is associated with a candidate panelist and, if so, then the first media data pair is likely to be associated with a panelist and/or a media presentation device associated with the panelist, such as a panelist of the media exposure measurement location 114 and/or the first media presentation device 106 associated with the panelist.

In some examples, the probability determiner circuitry 250 can determine whether a first media data pair and/or a second media data pair are associated with a panelist. For example, the probability determiner circuitry 250 can determine a first probability that the first media data pair is associated with a candidate panelist based on the first media data pair matching a third media data pair stored in the media presentation data database 280. For example, the third media data pair can be associated with an identifier (e.g., a panelist identifier) that identifies the candidate panelist. In some examples, the probability determiner circuitry 250 can determine a second probability that the second media data pair is associated with the candidate panelist based on the second media data pair matching a fourth media data pair stored in the media presentation data database 280. For example, the fourth media data pair can be associated with the identifier (e.g., the panelist identifier) that identifies the candidate panelist. In some such examples, the first probability and the second probability indicate a high likelihood that a respective one of the first media data pair and the second media data pair are associated with the candidate panelist based on the matchings. In some such examples, the probability determiner circuitry 250 can determine a third probability that the first media data pair and the second media data pair are associated with the candidate panelist based on the matchings. In some such examples, the third probability can be greater than the first probability and/or the second probability based on the increased number of matches. For example, the first probability can be determined based on one match (e.g., the first media data pair matching the third media data pair), the second probability can be determined based on one match (e.g., the second media data pair matching the fourth media data pair), and the third probability can be determined based on two matches (e.g., (i) the first media data pair matching the third media data pair and (ii) the second media data pair matching the fourth media data pair).

In some examples, the central facility 102 includes means for determining a probability that a candidate panelist is associated with a first media data pair. For example, the means for determining may be implemented by the probability determiner circuitry 250. In some such examples in which the first media data pair is associated with a third media data pair included in the first media presentation data, the probability determiner circuitry 250 is to, in response to a determination that the third media data pair matches the fourth media data pair, determine a probability that the panelist is associated with at least one of the first media data pair or the third media data pair based on at least one of (i) a first match of the first media data pair and the second media data pair or (ii) a second match of the third media data pair and the fourth media data pair.

In some examples, the probability determiner circuitry 250 may be implemented by executable instructions such as that implemented by at least block 310 of FIG. 3 and/or block 412 of FIG. 4. In other examples, the probability determiner circuitry 250 is implemented by hardware logic, hardware implemented state machines, logic circuitry, and/or any other combination of hardware, software, and/or firmware. For example, the probability determiner circuitry 250 may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 2, the central facility 102 includes the demographic identifier circuitry 260 to identify demographic data associated with a panelist. In some examples, the panelist identifier circuitry 240 can identify a candidate panelist as a panelist associated with one or more media data pairs obtained from the media provider 104. In some such examples, the demographic identifier circuitry 260 can identify an identifier corresponding to the panelist. In some such examples, the demographic identifier circuitry 260 can query the panelist demographic database 290 with the identifier and in response to the query can obtain demographic data (e.g., demographics) associated with the panelist. For example, the demographic identifier circuitry 260 can obtain from the panelist demographics database 290 an age, consumer purchase habits, an education, an ethnicity, a gender, an income category, a life stage, a profession, a residence, etc., associated with the panelist identifier that corresponds to the panelist.

In some examples, the central facility 102 includes means for identifying demographic data associated with identified one(s) of panelist(s). For example, the means for identifying may be implemented by the demographic identifier circuitry 260. In some examples, the demographic identifier circuitry 260 associates a set of media data pairs with demographic data of a panelist. For example, the demographic identifier circuitry 260 may be implemented by executable instructions such as that implemented by at least block 316 of FIG. 3 and/or block 416 of FIG. 4. In other examples, the demographic identifier circuitry 260 is implemented by hardware logic, hardware implemented state machines, logic circuitry, and/or any other combination of hardware, software, and/or firmware. For example, the demographic identifier circuitry 260 may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 2, the central facility 102 includes the report generator circuitry 270 to transmit a report including the demographic data to the media provider 104. In some examples, the report generator circuitry 270 generates a report including the demographic data associated with identified one(s) of panelist(s) associated with media presentation data provided by the media provider 104. In some such examples, the report generator circuitry 270 can generate the report to include one or more matching media pairs, one or more associated media pairs, etc., stored in the media presentation data database 280 that is/are associated with the identified one(s) of the panelist(s). In some examples, in response to identifying the panelist, the report generator circuitry 270 can cause one or more servers (e.g., one or more servers that may implement the media provider 104) to associate portion(s) of the media presentation data provided by the media provider 104 and corresponding demographic data included in a report by transmitting the report to the one or more servers, with the demographic data being associated with the identified one(s) of the panelist(s). Advantageously, the report generator circuitry 270 may improve the capabilities of the one or more servers by increasing the quantity and/or types of data associations of the media presentation data stored by the one or more servers. For example, the media provider 104 may be improved by the report generator circuitry 270 by storing additional data, such as associating demographic data that the media provider 104 did not previously store, and associating the additional data with the media presentation data stored by the media provider 104, the user information associated with the media presentation data stored by the media provider 104, etc., and/or a combination thereof.

In some examples, the central facility 102 includes means for causing a server to associate a second media data pair and demographic data included in a report by transmitting the report to the server in response to identifying the panelist, and the demographic data is associated with the panelist. For example, the means for causing may be implemented by the report generator circuitry 270. In some examples, the report generator circuitry 270 may be implemented by executable instructions such as that implemented by at least block 318 of FIG. 3 and/or block 418 of FIG. 4. In other examples, the report generator circuitry 270 is implemented by hardware logic, hardware implemented state machines, logic circuitry, and/or any other combination of hardware, software, and/or firmware. For example, the report generator circuitry 270 may be implemented by at least one hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

In the illustrated example of FIG. 2, the central facility 102 includes the media presentation data database 280 to record data (e.g., media presentation data, media data pair(s), media identifier(s), timestamp(s) or timestamp data, etc.). In some examples, the media presentation data database 280 stores data (e.g., media presentation data, media data pair(s), media identifier(s), timestamp(s) or timestamp data, etc.) obtained from meter(s) associated with media exposure measurement locations, such as the media exposure measurement location 114 of FIG. 1. For example, the media presentation data database 280 can store data obtained from the network meter 124, the media presentation device meter 126, and/or the software meter 134 operating in one or more media exposure measurement locations.

In some examples, the media presentation data database 280 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The media presentation data database 280 may additionally or alternatively be implemented by one or more double data rate (DDR) memories, such as DDR, DDR2, DDR3, DDR4, mobile DDR (mDDR), etc. The media presentation data database 280 may additionally or alternatively be implemented by one or more mass storage devices such as hard disk drive(s) (HDD(s)), compact disk (CD) drive(s), digital versatile disk (DVD) drive(s), solid-state disk (SSD) drive(s), etc. While in the illustrated example the media presentation data database 280 is illustrated as a single database, the media presentation data database 280 may be implemented by any number and/or type(s) of databases. Furthermore, the data stored in the media presentation data database 280 may be in any data format such as, for example, binary data, comma delimited data, tab delimited data, structured query language (SQL) structures, etc. For example, the media presentation data database 280 can be an organized body of related data, regardless of the manner in which the data or the organized body thereof is represented. In some such examples, the organized body of related data may be in the form of one or more of a table, a map, a grid, a packet, a datagram, a frame, a file, an e-mail, a message, a document, a report, a list, or in any other form.

In the illustrated example of FIG. 2, the central facility 102 includes the panelist demographics database 290 to record data (e.g., panelist identifier(s), panelist demographic data, panelist demographics, etc.). The panelist demographics database 290 may be implemented by a volatile memory (e.g., an SDRAM, a DRAM, an RDRAM, etc.) and/or a non-volatile memory (e.g., flash memory). The panelist demographics database 290 may additionally or alternatively be implemented by one or more DDR memories, such as DDR, DDR2, DDR3, DDR4, mDDR, etc. The panelist demographics database 290 may additionally or alternatively be implemented by one or more mass storage devices such as HDD(s), CD drive(s), DVD drive(s), SSD drive(s), etc. While in the illustrated example the panelist demographics database 290 is illustrated as a single database, the panelist demographics database 290 may be implemented by any number and/or type(s) of databases. Furthermore, the data stored in the panelist demographics database 290 be in any data format such as, for example, binary data, comma delimited data, tab delimited data, SQL structures, etc. For example, the panelist demographics database 290 can be an organized body of related data, regardless of the manner in which the data or the organized body thereof is represented. In some such examples, the organized body of related data may be in the form of one or more of a table, a map, a grid, a packet, a datagram, a frame, a file, an e-mail, a message, a document, a report, a list, or in any other form.

In some examples, the central facility 102 includes means for storing data (e.g., media presentation data, panelist demographics, etc.). For example, the means for storing may be implemented by the media presentation data database 280 and/or the panelist demographics database 290. In some examples, the media presentation data database 280 and/or the panelist demographics database 290 is implemented by hardware logic, hardware implemented state machines, logic circuitry, and/or any other combination of hardware, software, and/or firmware. For example, the media presentation data database 280 and/or the panelist demographics database 290 may be implemented by at least one volatile memory (e.g., an SDRAM, a DRAM, an RDRAM, etc.) and/or non-volatile memory (e.g., flash memory). The media presentation data database 280 and/or the panelist demographics database 290 may additionally or alternatively be implemented by one or more DDR memories, such as DDR, DDR2, DDR3, DDR4, mDDR, etc. The media presentation data database 280 and/or the panelist demographics database 290 may additionally or alternatively be implemented by one or more mass storage devices such as HDD(s), CD drive(s), DVD drive(s), SSD drive(s), etc.

While an example manner of implementing the central facility 102 of FIG. 1 is illustrated in FIG. 2, one or more of the elements, processes and/or devices illustrated in FIG. 2 may be combined, divided, re-arranged, omitted, eliminated and/or implemented in any other way. Further, the example communication interface 210, the example data extractor circuitry 220, the example data identifier circuitry 230, the example probability determiner 240, the example panelist identifier 250, the example demographic identifier circuitry 260, the example report generator 270, the example media presentation data database 280, the example panelist demographics database 290, the example bus 295 and/or, more generally, the example central facility 102 of FIG. 1 may be implemented by hardware, software, firmware, and/or any combination of hardware, software, and/or firmware. Thus, for example, any of the example communication interface 210, the example data extractor circuitry 220, the example data identifier circuitry 230, the example probability determiner 240, the example panelist identifier 250, the example demographic identifier circuitry 260, the example report generator 270, the example media presentation data database 280, the example panelist demographics database 290, the example bus 295 and/or, more generally, the example central facility 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) (e.g., field programmable gate array(s) FPGA (s)). When reading any of the apparatus or system claims of this patent to cover a purely software and/or firmware implementation, at least one of the example communication interface 210, the example data extractor circuitry 220, the example data identifier circuitry 230, the example probability determiner 240, the example panelist identifier 250, the example demographic identifier circuitry 260, the example report generator 270, the example media presentation data database 280, the example panelist demographics database 290, and/or the example bus 295 is/are hereby expressly defined to include a non-transitory computer readable storage device or storage disk such as a memory, a DVD, a CD, a Blu-ray disk, etc., including the software and/or firmware. Further still, the example central facility 102 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic circuitry, machine readable instructions, hardware implemented state machines, and/or any combination thereof for implementing the central facility 102 of FIGS. 1 and/or 2 are shown in FIGS. 3-4. The machine readable instructions may be one or more executable programs or portion(s) of an executable program for execution by processor circuitry, such as the processor circuitry 512 shown in the example processor platform 500 discussed below in connection with FIG. 5 and/or the example processor circuitry discussed below in connection with FIGS. 6 and/or 7. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 3 and/or 4, many other methods of implementing the example central facility 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3 and/or 4 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions 300 that may be executed to implement the example central facility 102 of FIGS. 1 and/or 2 to identify demographic data associated with a panelist. The machine readable instructions 300 begin at block 302, at which the central facility 102 obtains media presentation data from a media provider. For example, the communication interface 210 (FIG. 2) can obtain media presentation data including one or more media data pairs from the media provider 104 via the network 120 of FIG. 1.

At block 304, the central facility 102 extracts media data pairs from the media presentation data. For example, the data extractor circuitry 220 (FIG. 2) can extract the one or more media data pairs from the media presentation data. In some such examples, the data extractor circuitry 220 can extract a first media data pair including (i) a first media identifier identifying first media and a first timestamp corresponding to an access and/or presentation of the first media by a media presentation device, such as the first media presentation device 106 of FIG. 1, and (ii) a second media identifier identifying second media and a second timestamp corresponding to an access and/or presentation of the second media by a media presentation device, such as a media presentation device associated with one of the non-panelist household(s) 116 of FIG. 1.

At block 306, the central facility 102 identifies media data pair(s) in a media presentation data database. For example, the data identifier circuitry 230 (FIG. 2) can determine whether at least one of the first media identifier, the first timestamp, the second media identifier, or the second timestamp is included in the media presentation data stored in the media presentation data database 280. In some such examples, the data identifier circuitry 230 can query the media presentation data database 280 with the at least one of the first media identifier, the first timestamp, the second media identifier, or the second timestamp. In some such examples, in response to the mapping, the querying, etc., the data identifier circuitry 230 can determine that the first media identifier and the first timestamp match a third media identifier and a third timestamp stored in the media presentation data database 280.

At block 308, the central facility 102 identifies candidate panelist(s) associated with the media data pair(s). For example, the panelist identifier circuitry 240 (FIG. 2) can identify one or more candidate panelists associated with the third media identifier and the third timestamp based on an identifier (e.g., a panelist identifier, a media presentation device identifier, etc.) that corresponds to the third media identifier and the third timestamp.

At block 310, the central facility 102 determines a probability that the identified candidate panelist(s) are associated with the media data pair(s). For example, the probability determiner circuitry 250 (FIG. 2) can calculate and/or otherwise determine a first probability that a first one of the one or more candidate panelists are associated with the first media data pair and/or the second media data pair based on whether the first media data pair and/or the second media data pair match portion(s) of the media presentation data database 280. In some such examples, the probability determiner circuitry 250 can calculate and/or otherwise determine a second probability that a second one of the one or more candidate panelists are associated with the first media data pair and/or the second media data pair based on whether the first media data pair and/or the second media data pair match portion(s) of the media presentation data database 280. In some such examples, the probability determiner circuitry 250 can determine the first probability to be a relatively high probability (e.g., 0.7 or 70%, 0.85 or 85%, 0.99 or 99%, etc.) indicative of the first media data pair being associated with a panelist having an identifier that corresponds to the third media data pair.

At block 312, the central facility 102 determines whether one(s) of the probabilities satisfy a threshold. For example, the panelist identifier circuitry 240 can determine whether the first probability and/or the second probability satisfies a probability threshold. In some such examples, the panelist identifier circuitry 240 can determine that the first probability is greater than or equal to the probability threshold and, thus, satisfies the probability threshold. In some such examples, the probability threshold can be indicative of a media data pair being likely (e.g., highly likely) associated with a corresponding panelist in response to the probability threshold being satisfied.

If, at block 312, the central facility 102 determines that the one(s) of the probabilities do not satisfy the threshold, control proceeds to block 320 to determine whether to select additional media presentation data to process. If, at block 312, the central facility 102 determines that the one(s) of the probabilities satisfy the threshold, then, at block 314, the central facility 102 identifies one(s) of the candidate panelist(s) as panelist(s) associated with one(s) of the media data pairs. For example, the panelist identifier circuitry 240 can identify the first one of the one or more candidate panelists as a panelist associated with the first media data pair. In some such examples, the panelist identifier circuitry 240 can determine that the first media data pair is likely to have been generated in response to an access and/or presentation of the first media by the panelist, a media presentation device associated with the panelist, etc.

At block 316, the central facility 102 identifies demographic data associated with the identified one(s) of the panelist(s). For example, the demographic identifier circuitry 260 (FIG. 2) can map the identifier of the panelist to demographic data associated with the panelist in the panelist demographics database 290 (FIG. 2).

At block 318, the central facility 102 transmits a report including the demographic data to the media provider. For example, the report generator circuitry 270 (FIG. 2) can generate a report including one or more media data pairs and corresponding demographic data. In some such examples, the report generator circuitry 270 can generate the report to include the first media data pair and demographic data that corresponds to a panelist that is associated with the first media data pair. In some such examples, in response to identifying the panelist, the report generator circuitry 270 can cause a server of the media provider 104 to associate the first media data pair and the demographic data included in the report by transmitting the report to the server.

At block 320, the central facility 102 determines whether additional media presentation data has been obtained. For example, the communication interface 210 can determine whether additional media presentation data from the media provider 104 has been obtained. If, at block 320, the central facility 102 determines that additional media presentation data has been obtained, control returns to block 302 to obtain the media additional media presentation data from the media provider 104. If, at block 320, the central facility 102 determines that additional media presentation data has not been obtained, then the machine readable instructions 300 of FIG. 3 conclude.

FIG. 4 is another flowchart representative of example machine readable instructions 400 that may be executed to implement the example central facility 102 of FIGS. 1 and/or 2 to identify demographic data associated with a panelist. The machine readable instructions 400 begin at block 402, at which the central facility 102 selects a set of media data pairs to process. For example, the data identifier circuitry 230 (FIG. 2) can select a set of a first media data pair, a second media data pair, a third media data pair, a fourth media data pair, and a fifth media data pair included in media presentation data obtained from the media provider 104 via the network 120 of FIG. 1. In some such examples, the first media data pair can include a first media identifier that identifies first media and a first timestamp corresponding to an access and/or presentation of the first media at a first time by a media presentation device, such as the first media presentation device 106 of FIG. 1. In some such examples, the second media data pair can include the first media identifier and a second timestamp corresponding to an access and/or presentation of the first media at a second time after the first time by the media presentation device. In some such examples, the third media data pair can include the first media identifier and a third timestamp corresponding to an access and/or presentation of the first media at a third time after the second time by the media presentation device. In some such examples, the fourth media data pair can include the first media identifier and a fourth timestamp corresponding to an access and/or presentation of the first media at a fourth time after the third time by the media presentation device. In some such examples, the fifth media data pair can include a second media identifier that identifies second media and a fifth timestamp corresponding to an access and/or presentation of the second media at a fifth time by a media presentation device, such as one of the media presentation devices 106, 108, 110, 112. In some such examples, the fifth media data pair may be associated with a panelist, such as a panelist associated with the media exposure measurement location 114, or a non-panelist, such as a non-panelist associated with one of the non-panelist household(s) 116.

At block 404, the central facility 102 queries media presentation data database with a media data pair of the set. For example, the data identifier circuitry 230 can query the media presentation data database 280 (FIG. 2) with the first media data pair or portion(s) thereof.

At block 406, the central facility 102 determines whether a match is found. For example, the data identifier circuitry 230 can determine whether at least one of the first media identifier or the first timestamp matches a media identifier and/or a timestamp stored in the media presentation data database 280. In some such examples, the data identifier circuitry 230 can determine that the first media identifier and the first timestamp match a sixth media data pair including a sixth media identifier and a sixth timestamp in the media presentation data database 280.

If, at block 406, the central facility 102 determines that a match is not found, then, at block 408, the central facility 102 determines whether to select another media data pair of the set to process. For example, the data identifier circuitry 230 can determine to select the second media data set to process. If, at block 408, the central facility 102 determines to select another media data pair of the set to process, control returns to block 404 to query the media presentation data database with another media data pair of the set. If, at block 408, the central facility 102 determines not to select another media data pair of the set to process, control proceeds to block 420 to determine whether to select another set of the media presentation data to process.

If, at block 406, the central facility 102 determines that a match is found, control proceeds to block 410 to compare associated media data pairs of the match in the media presentation data database with the remaining media data pairs of the set. For example, the data identifier circuitry 230 can identify one or more associated media data pairs of the sixth media data pair, such as a seventh media data pair, an eighth media data pair, etc. In some such examples, the data identifier circuitry 230 can determine that the seventh media data pair and the eighth media data pair are associated with the sixth media data pair in response to a determination that the seventh and eighth media data pairs have the same media identifier as the sixth media data pair. In some such examples, the data identifier circuitry 230 can determine that the seventh media data pair and the eighth media data pair are associated with the sixth media data pair in response to a determination that the sixth through eighth media data pairs are associated with the same media presentation device, such as the first media presentation device 106. In some such examples, the data identifier circuitry 230 can determine that the seventh media data pair and the eighth media data pair are associated with the sixth media data pair in response to a determination that the sixth through eighth media data pairs are associated with the same media stream session indicated by the same media session identifier.

In some such examples, the data identifier circuitry 230 can compare one or more of the remaining media data pairs of the set, such as the second media data pair, the third media data pair, and/or the fourth media data pair, with one or more of the associated media data pairs of the sixth media data pair, such as the seventh media data pair and/or the eighth media data pair. In some such examples, the data identifier circuitry 230 can determine that one(s) of the second media data pair, the third media data pair, and/or the fourth media data pair match one(s) of the seventh media data pair and/or the eighth media data pair At block 412, the central facility 102 determines whether the set of the media data pairs are associated with a panelist based on the comparisons. For example, the probability determiner circuitry 250 (FIG. 2) can determine a probability indicative of a likelihood that the set of the media data pairs are associated with a panelist, such as a panelist associated with the media exposure measurement location 114. In some such examples, the probability determiner circuitry 250 can determine increasing values of the probability as the number of matches between the set of the media data pairs and the associated media data pairs increases. In some such examples, the probability determiner circuitry 250 can determine decreasing values of the probability as the number of matches between the set of the media data pairs and the associated media data pairs decreases. In some such examples, the panelist identifier circuitry 240 (FIG. 2) can determine that the panelist is associated with the set of the media data pairs based on the value(s) of the probability.

If, at block 412, the central facility 102 determines that the set of the media data pairs are not associated with a panelist based on the comparisons, then, at block 414, the central facility 102 associates the set of the media data pairs with a non-panelist. For example, the panelist identifier circuitry 240 can associate the set of the media data pairs with a non-panelist, a media presentation device associated with the non-panelist. In some such examples, the non-panelist may be associated with one of the non-panelist household(s) 116 of FIG. 1. In response to associating the set of the media data pairs with a non-panelist at block 414, control proceeds to block 420 to determine whether to select another set of the media presentation data to process.

If, at block 412, the central facility 102 determines that the set of the media data pairs are associated with a panelist based on the comparisons, control proceeds to block 416 to associate the set of the media data pairs with demographic data of a panelist. For example, the demographic identifier circuitry 260 (FIG. 2) can identify demographic data in the panelist demographics database 290 (FIG. 2) corresponding to a panelist associated with the set of the media data pairs.

In response to associating the set of the media data pairs with demographic data of a panelist at block 416, the central facility 102 generates a report including at least one of the media data pairs or the demographic data at block 418. For example, the report generator circuitry 270 (FIG. 2) can generate a report including at least one of (i) one or more of the set of the media data pairs or (ii) demographic data corresponding to a panelist (e.g., an AME panelist) associated with the one or more of the set of the media data pairs.

At block 420, the central facility 102 determines whether to select another set of media presentation data to process. For example, the data identifier circuitry 230 can determine whether to select another set of the media data pairs to process, such as a ninth media data pair, a tenth media data pair, etc., included in media presentation data obtained from the media provider 104.

If, at block 420, the central facility 102 determines to select another set of media presentation data to process, control returns to block 402 to select another set of the media data pairs to process. If, at block 420, the central facility 102 determines not to select another set of media presentation data to process, then the machine readable instructions 400 of FIG. 4 conclude.

Figure 5:
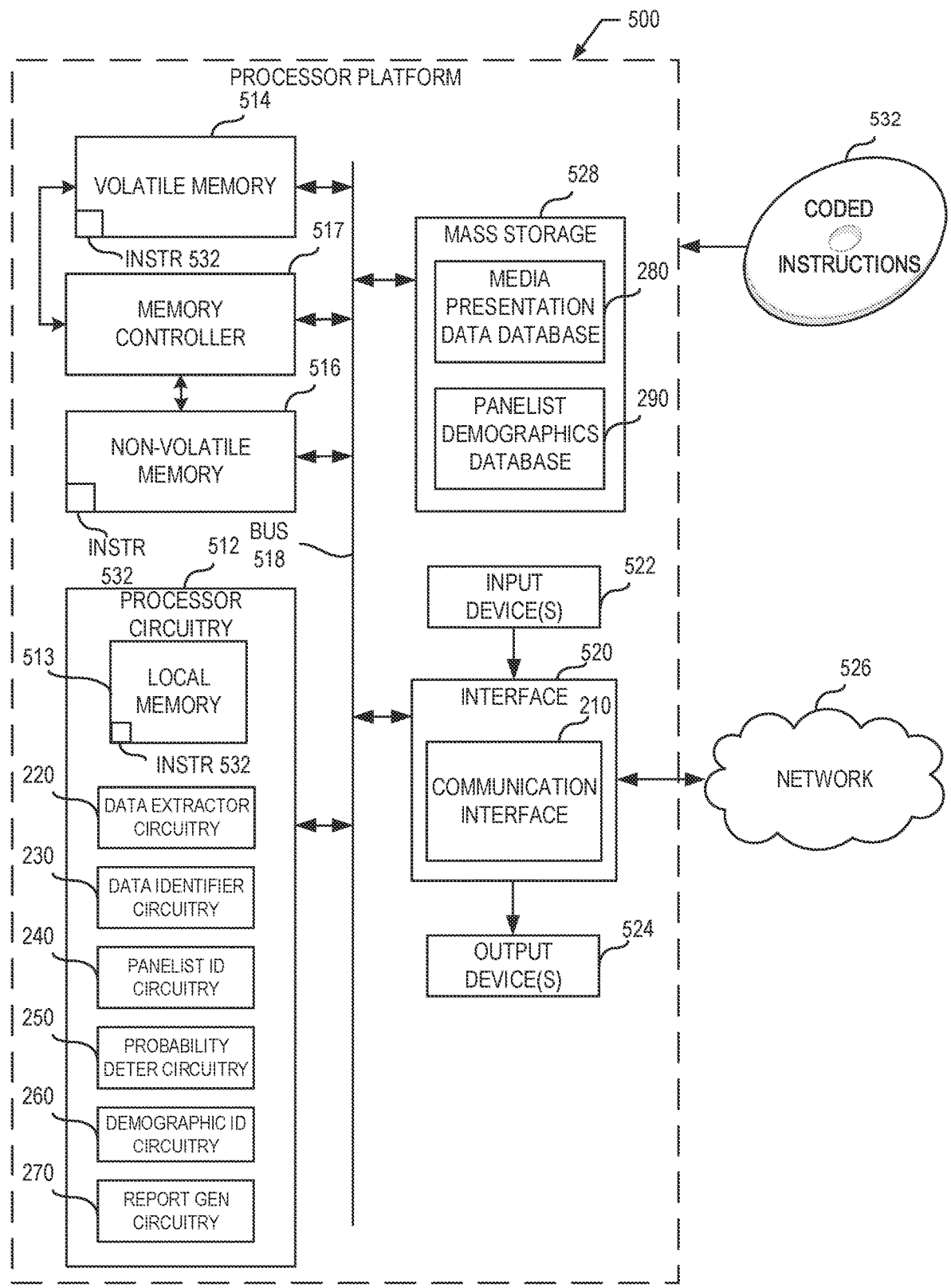
FIG. 5 is a block diagram of an example processing platform including processor circuitry structured to execute the example machine readable instructions of FIGS. 3 and/or 4 to implement the example central facility of FIGS. 1 and/or 2.

FIG. 5 is a block diagram of an example processor platform 500 structured to execute and/or instantiate the machine readable instructions of FIGS. 3-4 to implement the central facility 102 of FIGS. 1 and/or 2. The processor platform 500 can be, for example, a server, a personal computer, a workstation, a self-learning machine (e.g., a neural network), or any other type of computing device.

The processor platform 500 of the illustrated example includes processor circuitry 512. The processor circuitry 512 of the illustrated example is hardware. For example, the processor circuitry 512 can be implemented by one or more integrated circuits, logic circuits, FPGAs, microprocessors, GPUs, DSPs, and/or microcontrollers from any desired family or manufacturer. The hardware processor may be a semiconductor based (e.g., silicon based) device. In this example, the processor circuitry 512 implements the example data extractor circuitry 220, the example data identifier circuitry 230, the example panelist identifier circuitry 240, the example probability determiner 250, the example demographic identifier circuitry 260, and the example report generator circuitry 270 of FIG. 2.

The processor circuitry 512 of the illustrated example includes a local memory 513 (e.g., a cache). The processor circuitry 512 of the illustrated example is in communication with a main memory including a volatile memory 514 and a non-volatile memory 516 via a bus 518. The volatile memory 514 may be implemented by SDRAM, DRAM, RDRAM®, and/or any other type of random access memory device. The non-volatile memory 516 may be implemented by flash memory and/or any other desired type of memory device. Access to the main memory 514, 516 is controlled by a memory controller 517.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor circuitry 512. The input device(s) 522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc. In this example, the interface circuit 520 implements the example communication interface 210 of FIG. 2.

The processor platform 500 of the illustrated example also includes one or more mass storage devices 528 for storing software and/or data. Examples of such mass storage devices 528 include floppy disk drives, hard drive disks, CD drives, Blu-ray disk drives, redundant array of independent disks (RAID) systems, and DVD drives. In this example, the one or more mass storage devices 528 implement the example media presentation data database 280 and the example panelist demographics database 290 of FIG. 2.

The machine readable instructions 532 of FIGS. 3-4 may be stored in the mass storage device 528, in the volatile memory 514, in the non-volatile memory 516, and/or on a removable non-transitory computer readable medium such as a CD or DVD.

Figure 6:
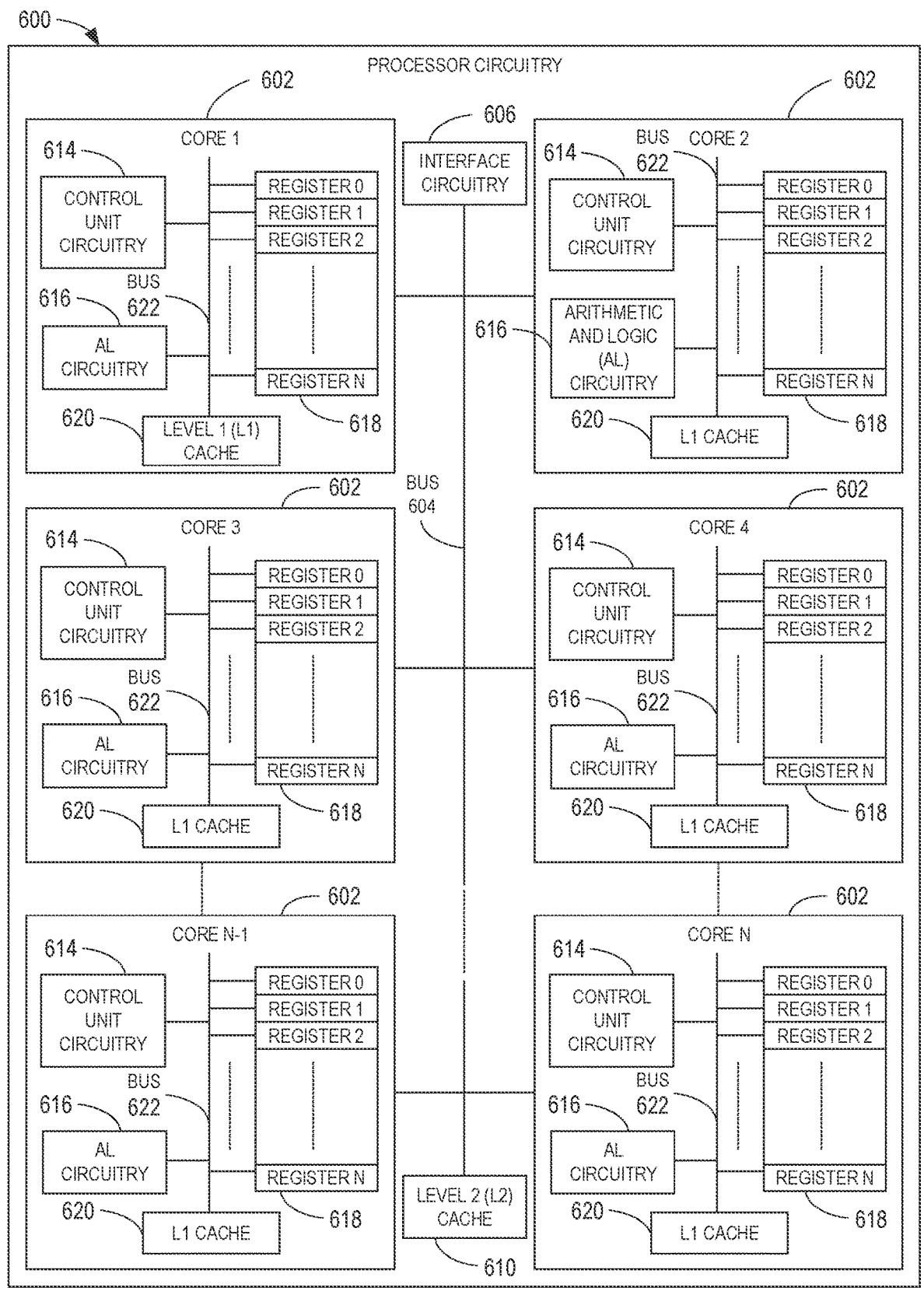
FIG. 6 is a block diagram of an example implementation of the processor circuitry of FIG. 5.

FIG. 6 is a block diagram of an example implementation of the processor circuitry 512 of FIG. 5. In this example, the processor circuitry 512 of FIG. 5 is implemented by a microprocessor 600. For example, the microprocessor 600 may implement multi-core hardware circuitry such as a CPU, a DSP, a GPU, an XPU, etc. Although it may include any number of example cores 602 (e.g., 1 core), the microprocessor 600 of this example is a multi-core semiconductor device including N cores. The cores 602 of the microprocessor 600 may operate independently or may cooperate to execute machine readable instructions. For example, machine code corresponding to a firmware program, an embedded software program, or a software program may be executed by one of the cores 602 or may be executed by multiple ones of the cores 602 at the same or different times. In some examples, the machine code corresponding to the firmware program, the embedded software program, or the software program is split into threads and executed in parallel by two or more of the cores 602. The software program may correspond to a portion or all of the machine readable instructions and/or operations represented by the flowcharts of FIGS. 3-4.

The cores 602 may communicate by an example bus 604. In some examples, the bus 604 may implement a communication bus to effectuate communication associated with one(s) of the cores 602. For example, the bus 604 may implement at least one of an Inter-Integrated Circuit (I2C) bus, a Serial Peripheral Interface (SPI) bus, a PCI bus, or a PCIe bus. Additionally or alternatively, the bus 604 may implement any other type of computing or electrical bus. The cores 602 may obtain data, instructions, and/or signals from one or more external devices by example interface circuitry 606. The cores 602 may output data, instructions, and/or signals to the one or more external devices by the interface circuitry 606. Although the cores 602 of this example include example local memory 620 (e.g., Level 1 (L1) cache that may be split into an L1 data cache and an L1 instruction cache), the microprocessor 600 also includes example shared memory 610 that may be shared by the cores (e.g., Level 2 (L2_cache)) for high-speed access to data and/or instructions. Data and/or instructions may be transferred (e.g., shared) by writing to and/or reading from the shared memory 610. The local memory 620 of each of the cores 602 and the shared memory 610 may be part of a hierarchy of storage devices including multiple levels of cache memory and the main memory (e.g., the main memory 514, 516 of FIG. 5). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 602 may be referred to as a CPU, DSP, GPU, etc., or any other type of hardware circuitry. Each core 602 includes control unit circuitry 614, arithmetic and logic (AL) circuitry (sometimes referred to as an ALU) 616, a plurality of registers 618, the L1 cache 620, and an example bus 622. Other structures may be present. For example, each core 602 may include vector unit circuitry, single instruction multiple data (SIMD) unit circuitry, load/store unit (LSU) circuitry, branch/jump unit circuitry, floating-point unit (FPU) circuitry, etc. The control unit circuitry 614 includes semiconductor-based circuits structured to control (e.g., coordinate) data movement within the corresponding core 602. The AL circuitry 616 includes semiconductor-based circuits structured to perform one or more mathematic and/or logic operations on the data within the corresponding core 602. The AL circuitry 616 of some examples performs integer based operations. In other examples, the AL circuitry 616 also performs floating point operations. In yet other examples, the AL circuitry 616 may include first AL circuitry that performs integer based operations and second AL circuitry that performs floating point operations. In some examples, the AL circuitry 616 may be referred to as an Arithmetic Logic Unit (ALU). The registers 618 are semiconductor-based structures to store data and/or instructions such as results of one or more of the operations performed by the AL circuitry 616 of the corresponding core 602. For example, the registers 618 may include vector register(s), SIMD register(s), general purpose register(s), flag register (s), segment register(s), machine specific register(s), instruction pointer register(s), control register(s), debug register(s), memory management register(s), machine check register(s), etc. The registers 618 may be arranged in a bank as shown in FIG. 6. Alternatively, the registers 618 may be organized in any other arrangement, format, or structure including distributed throughout the core 602 to shorten access time. The bus 622 may implement at least one of an I2C bus, a SPI bus, a PCI bus, or a PCIe bus Each core 602 and/or, more generally, the microprocessor 600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 600 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 7:
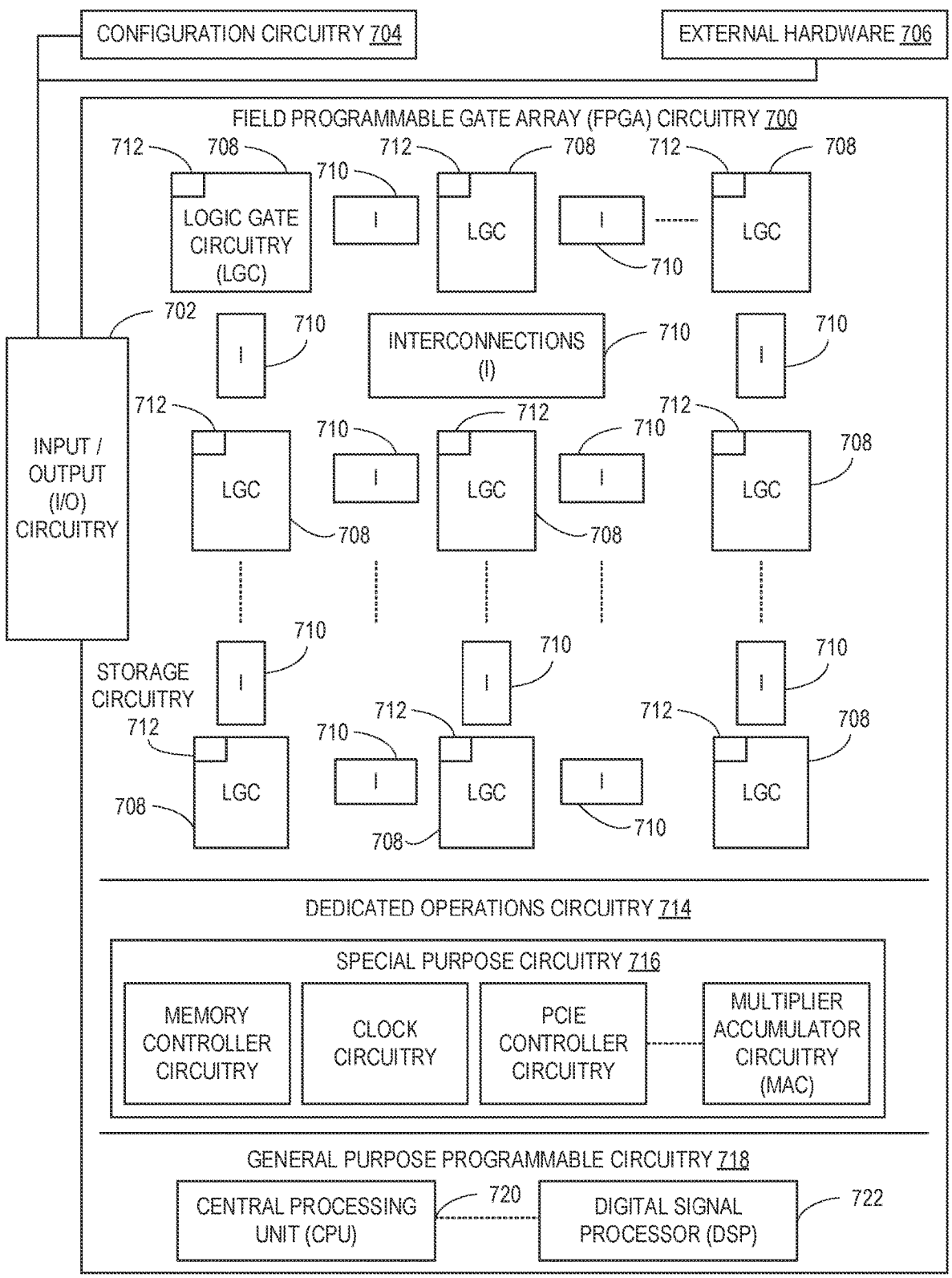
FIG. 7 is a block diagram of another example implementation of the processor circuitry of FIG. 5.

FIG. 7 is a block diagram of another example implementation of the processor circuitry 512 of FIG. 5. In this example, the processor circuitry 512 is implemented by FPGA circuitry 700. The FPGA circuitry 700 can be used, for example, to perform operations that could otherwise be performed by the example microprocessor 600 of FIG. 6 executing corresponding machine readable instructions. However, once configured, the FPGA circuitry 700 instantiates the machine readable instructions in hardware and, thus, can often execute the operations faster than they could be performed by a general purpose microprocessor executing the corresponding software.

More specifically, in contrast to the microprocessor 600 of FIG. 6 described above (which is a general purpose device that may be programmed to execute some or all of the machine readable instructions represented by the flowcharts of FIG. 3-4 but whose interconnections and logic circuitry are fixed once fabricated), the FPGA circuitry 700 of the example of FIG. 7 includes interconnections and logic circuitry that may be configured and/or interconnected in different ways after fabrication to instantiate, for example, some or all of the machine readable instructions represented by the flowcharts of FIGS. 3-4. In particular, the FPGA 700 may be thought of as an array of logic gates, interconnections, and switches. The switches can be programmed to change how the logic gates are interconnected by the interconnections, effectively forming one or more dedicated logic circuits (unless and until the FPGA circuitry 700 is reprogrammed). The configured logic circuits enable the logic gates to cooperate in different ways to perform different operations on data received by input circuitry. Those operations may correspond to some or all of the software represented by the flowcharts of FIGS. 3-4. As such, the FPGA circuitry 700 may be structured to effectively instantiate some or all of the machine readable instructions of the flowchart of FIGS. 3-4 as dedicated logic circuits to perform the operations corresponding to those software instructions in a dedicated manner analogous to an ASIC. Therefore, the FPGA circuitry 700 may perform the operations corresponding to the some or all of the machine readable instructions of FIGS. 3-4 faster than the general purpose microprocessor can execute the same.

In the example of FIG. 7, the FPGA circuitry 700 is structured to be programmed (and/or reprogrammed one or more times) by an end user by a hardware description language (HDL) such as Verilog. The FPGA circuitry 700 of FIG. 7, includes example input/output (I/O) circuitry 702 to obtain and/or output data to/from example configuration circuitry 704 and/or external hardware (e.g., external hardware circuitry) 706. For example, the configuration circuitry 704 may implement interface circuitry that may obtain machine readable instructions to configure the FPGA circuitry 700, or portion(s) thereof. In some such examples, the configuration circuitry 704 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 706 may implement the microprocessor 600 of FIG. 6. The FPGA circuitry 700 also includes an array of example logic gate circuitry 708, a plurality of example configurable interconnections 710, and example storage circuitry 712. The logic gate circuitry 708 and interconnections 710 are configurable to instantiate one or more operations that may correspond to at least some of the machine readable instructions of FIGS. 3-4 and/or other desired operations. The logic gate circuitry 708 shown in FIG. 7 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors)

are present within each of the logic gate circuitry 708 to enable configuration of the electrical structures and/or the logic gates to form circuits to perform desired operations. The logic gate circuitry 708 may include other electrical structures such as look-up tables (LUTs), registers (e.g., flip-flops or latches), multiplexers, etc.

The interconnections 710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 708 to program desired logic circuits.

The storage circuitry 712 of the illustrated example is structured to store result(s) of the one or more of the operations performed by corresponding logic gates. The storage circuitry 712 may be implemented by registers or the like. In the illustrated example, the storage circuitry 712 is distributed amongst the logic gate circuitry 708 to facilitate access and increase execution speed.

The example FPGA circuitry 700 of FIG. 7 also includes example Dedicated Operations Circuitry 714. In this example, the Dedicated Operations Circuitry 714 includes special purpose circuitry 716 that may be invoked to implement commonly used functions to avoid the need to program those functions in the field. Examples of such special purpose circuitry 716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 700 may also include example general purpose programmable circuitry 718 such as an example CPU 720 and/or an example DSP 722. Other general purpose programmable circuitry 718 may additionally or alternatively be present such as a GPU, an XPU, etc., that can be programmed to perform other operations.

Although FIGS. 6 and 7 illustrate two example implementations of the processor circuitry 512 of FIG. 5, many other approaches are contemplated. For example, as mentioned above, modern FPGA circuitry may include an onboard CPU, such as one or more of the example CPU 720 of FIG. 7. Therefore, the processor circuitry 512 of FIG. 5 may additionally be implemented by combining the example microprocessor 600 of FIG. 6 and the example FPGA circuitry 700 of FIG. 7. In some such hybrid examples, a first portion of the machine readable instructions represented by the flowcharts of FIG. 3-4 may be executed by one or more of the cores 602 of FIG. 6 and a second portion of the machine readable instructions represented by the flowcharts of FIGS. 3-4 may be executed by the FPGA circuitry 700 of FIG. 7.

In some examples, the processor circuitry 512 of FIG. 5 may be in one or more packages. For example, the processor circuitry 600 of FIG. 6 and/or the FPGA circuitry 700 of FIG. 7 may be in one or more packages. In some examples, an XPU may be implemented by the processor circuitry 512 of FIG. 5, which may be in one or more packages. For example, the XPU may include a CPU in one package, a DSP in another package, a GPU in yet another package, and an FPGA in still yet another package.

Figure 8:
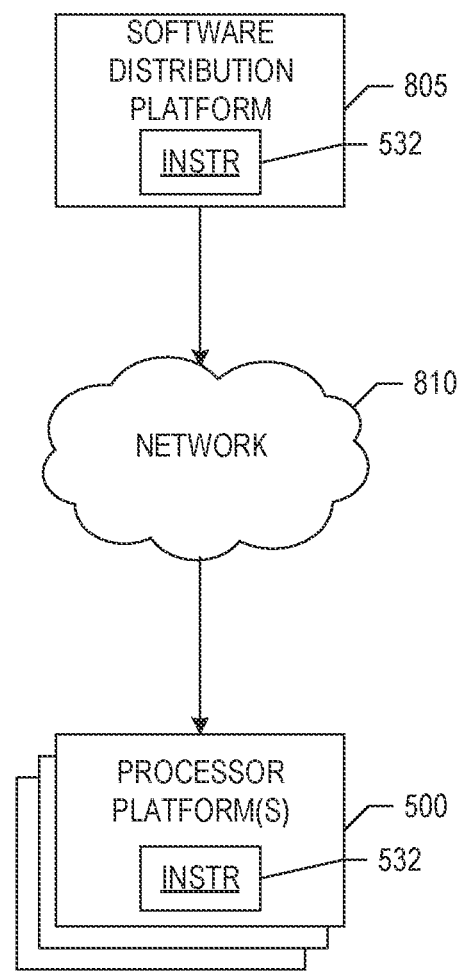
FIG. 8 is a block diagram of an example software distribution platform to distribute software to client devices such as consumers, retailers, and/or original equipment manufacturers (OEMs).

FIG. 8 is a block diagram of an example software distribution platform to distribute software (e.g., software corresponding to the example machine readable instructions 300 of FIG. 3 and/or the example machine readable instructions 400 of FIG. 4) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers). The example software distribution platform 805 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example machine readable instructions 532 of FIG. 5. The third parties may be consumers, users, retailers, OEMs, etc., who purchase and/or license the software for use and/or re-sale and/or sub-licensing. In the illustrated example, the software distribution platform 805 includes one or more servers and one or more storage devices. The storage devices store the machine readable instructions 532, which may correspond to the example machine readable instructions 300, 400 of FIGS. 3-4, as described above. The one or more servers of the example software distribution platform 805 are in communication with a network 810, which may correspond to any one or more of the Internet and/or any of the example networks 120, 526 described above. In some examples, the one or more servers are responsive to requests to transmit the software to a requesting party as part of a commercial transaction. Payment for the delivery, sale and/or license of the software may be handled by the one or more servers of the software distribution platform 805 and/or via a third party payment entity. The servers enable purchasers and/or licensors to download the machine readable instructions 532 from the software distribution platform 805. For example, the software, which may correspond to the example machine readable instructions 300, 400 of FIGS. 3-4, may be downloaded to the example processor platform 500, which is to execute the machine readable instructions 532 to implement the example central facility 102 of FIGS. 1 and/or 2. In some example, one or more servers of the software distribution platform 805 periodically offer, transmit, and/or force updates to the software (e.g., the example machine readable instructions 532 of FIG. 5) to ensure improvements, patches, updates, etc. are distributed and applied to the software at the end user devices.

From the foregoing, it will be appreciated that example systems, methods, apparatus, and articles of manufacture have been disclosed for determining the demographics of users. The disclosed systems, methods, apparatus, and articles of manufacture analyze media presentation data obtained from a media provider. The disclosed systems, methods, apparatus, and articles of manufacture determine whether a portion of the media presentation data, such as a media data pair, is associated with a panelist of an AME. Advantageously, the disclosed systems, methods, apparatus, and articles of manufacture may identify the panelist based on a relatively small number of data types (e.g., a media identifier, a timestamp, etc.) and/or quantities of the data types (e.g., four media identifiers and four timestamps, eight media identifiers and eight timestamps, etc.). The disclosed systems, methods, apparatus, and articles of manufacture improve the efficiency of using a computing device by reducing a search corpus of a database by comparing media presentation data from the media provider to matching and associated media presentation data rather than an entirety of the database. The disclosed systems, methods, apparatus, and articles of manufacture are accordingly directed to one or more improvement(s) in the functioning of a computer because a reduction in compute resources may be realized when effectuating a search of the database as described above.

Example methods, apparatus, systems, and articles of manufacture for determining the demographics of users are disclosed herein. Further examples and combinations thereof include the following:

Example 1 includes an apparatus comprising at least one memory, instructions, and processor circuitry to at least one of execute or instantiate the instructions to extract a first media data pair from first media presentation data obtained from a media provider, the first media presentation data generated in response to first media presentation devices accessing streaming media provided by the media provider, identify a second media data pair in second media presentation data based on a comparison of the first media data pair and the second media presentation data, the second media data pair generated in response to a meter accessing streaming data associated with a second media presentation device accessing the streaming media, identify a panelist associated with the second media data pair, and in response to identifying the panelist, cause a server to associate the second media data pair and demographic data included in a report by transmitting the report to the server, the demographic data associated with the panelist.

Example 2 includes the apparatus of example 1, wherein the first media data pair includes first data and second data, the first data including an identification of the streaming media, the second data including a timestamp corresponding to an access of the streaming media.

Example 3 includes the apparatus of example 1, wherein the processor circuitry is to identify a candidate panelist based on a match of the first media data pair and the second media data pair, determine a probability that the candidate panelist is associated with the first media data pair, and in response to a determination that the probability satisfies a threshold, identify the candidate panelist as the panelist.

Example 4 includes the apparatus of example 1, wherein the first media data pair is associated with a third media data pair included in the first media presentation data, and the processor circuitry is to in response to a query of a database with the first media data pair, determine whether the first media data pair matches the second media data pair, the database to store the second media presentation data, in response to a determination that the first media data pair matches the second media data pair, identify a fourth media data pair associated with the second media data pair, the fourth media data pair stored in the database, and in response to a determination that the third media data pair matches the fourth media data pair, determine a probability that the panelist is associated with at least one of the first media data pair or the third media data pair based on at least one of (i) a first match of the first media data pair and the second media data pair or (ii) a second match of the third media data pair and the fourth media data pair.

Example 5 includes the apparatus of example 4, wherein the panelist is a candidate panelist, and the processor circuitry is to identify the candidate panelist as a non-panelist in response to a determination that the second media data pair does not match the fourth media data pair.

Example 6 includes the apparatus of example 1, wherein at least one of the first media presentation data or the second media presentation data is obtained from a streaming device, the streaming device associated with at least one of a desktop computer, a laptop computer, a smartphone, a tablet, or a television.

Example 7 includes the apparatus of example 1, wherein the streaming media is accessed from at least one of a desktop computer, a laptop computer, a smartphone, a tablet, or a television through a streaming meter.

Example 8 includes an apparatus comprising means for extracting a first media data pair from first media presentation data obtained from a media provider, the first media presentation data generated in response to first media presentation devices accessing streaming media provided by the media provider, first means for identifying a second media data pair in second media presentation data based on a comparison of the first media data pair and the second media presentation data, the second media data pair generated in response to a meter accessing streaming data associated with a second media presentation device accessing the streaming media, second means for identifying a panelist associated with the second media data pair, and means for causing a server to associate the second media data pair and demographic data included in a report by transmitting the report to the server in response to identifying the panelist, the demographic data associated with the panelist.

Example 9 includes the apparatus of example 8, wherein the first media data pair includes first data and second data, the first data including an identification of the streaming media, the second data including a timestamp corresponding to an access of the streaming media.

Example 10 includes the apparatus of example 8, further including the second means for identifying to identify a candidate panelist based on a match of the first media data pair and the second media data pair, means for determining a probability that the candidate panelist is associated with the first media data pair, and the second means for identifying to, in response to a determination that the probability satisfies a threshold, identify the candidate panelist as the panelist.

Example 11 includes the apparatus of example 8, wherein the first media data pair is associated with a third media data pair included in the first media presentation data, and further including the first means for identifying to in response to a query of a database with the first media data pair, determine whether the first media data pair matches the second media data pair, the database to store the second media presentation data, and in response to a determination that the first media data pair matches the second media data pair, identify a fourth media data pair associated with the second media data pair, the fourth media data pair stored in the database, and means for determining to, in response to a determination that the third media data pair matches the fourth media data pair, determine a probability that the panelist is associated with at least one of the first media data pair or the third media data pair based on at least one of (i) a first match of the first media data pair and the second media data pair or (ii) a second match of the third media data pair and the fourth media data pair.

Example 12 includes the apparatus of example 11, wherein the panelist is a candidate panelist, and the second means for identifying is to identify the candidate panelist as a non-panelist in response to a determination that the second media data pair does not match the fourth media data pair.

Example 13 includes the apparatus of example 8, wherein at least one of the first media presentation data or the second media presentation data is obtained from a streaming device, the streaming device associated with at least one of a desktop computer, a laptop computer, a smartphone, a tablet, or a television.

Example 14 includes the apparatus of example 8, wherein the streaming media is accessed from at least one of a desktop computer, a laptop computer, a smartphone, a tablet, or a television through a streaming meter.

Example 15 includes a non-transitory computer readable medium comprising instructions that, when executed, cause processor circuitry to at least extract a first media data pair from first media presentation data obtained from a media provider, the first media presentation data generated in response to first media presentation devices accessing streaming media provided by the media provider, identify a second media data pair in second media presentation data based on a comparison of the first media data pair and the second media presentation data, the second media data pair generated in response to a meter accessing streaming data associated with a second media presentation device accessing the streaming media, identify a panelist associated with the second media data pair, and in response to identifying the panelist, cause a server to associate the second media data pair and demographic data included in a report by transmitting the report to the server, the demographic data associated with the panelist.

Example 16 includes the non-transitory computer readable medium of example 15, wherein the first media data pair includes first data and second data, the first data including an identification of the streaming media, the second data including a timestamp corresponding to an access of the streaming media.

Example 17 includes the non-transitory computer readable medium of example 15, wherein the instructions, when executed, cause the processor circuitry to identify a candidate panelist based on a match of the first media data pair and the second media data pair, determine a probability that the candidate panelist is associated with the first media data pair, and in response to a determination that the probability satisfies a threshold, identify the candidate panelist as the panelist.

Example 18 includes the non-transitory computer readable medium of example 15, wherein the first media data pair is associated with a third media data pair included in the first media presentation data, and the instructions, when executed, cause the processor circuitry to in response to a query of a database with the first media data pair, determine whether the first media data pair matches the second media data pair, the database to store the second media presentation data, in response to a determination that the first media data pair matches the second media data pair, identify a fourth media data pair associated with the second media data pair, the fourth media data pair stored in the database, and in response to a determination that the third media data pair matches the fourth media data pair, determine a probability that the panelist is associated with at least one of the first media data pair or the third media data pair based on at least one of (i) a first match of the first media data pair and the second media data pair or (ii) a second match of the third media data pair and the fourth media data pair.

Example 19 includes the non-transitory computer readable medium of example 18, wherein the panelist is a candidate panelist, and the instructions, when executed, cause the processor circuitry to identify the candidate panelist as a non-panelist in response to a determination that the second media data pair does not match the fourth media data pair.

Example 20 includes the non-transitory computer readable medium of example 15, wherein at least one of the first media presentation data or the second media presentation data is obtained from a streaming device, the streaming device associated with at least one of a desktop computer, a laptop computer, a smartphone, a tablet, or a television.

Example 21 includes the non-transitory computer readable medium of example 15, wherein the streaming media is accessed from at least one of a desktop computer, a laptop computer, a smartphone, a tablet, or a television through a streaming meter.

Example 22 includes an apparatus comprising a data extractor circuitry to extract a first media data pair from first media presentation data obtained from a media provider, the first media presentation data generated in response to first media presentation devices accessing streaming media provided by the media provider, a data identifier to identify a second media data pair in second media presentation data based on a comparison of the first media data pair and the second media presentation data, the second media data pair generated in response to a meter accessing streaming data associated with a second media presentation device accessing the streaming media, a panelist identifier to identify a panelist associated with the second media data pair, and in response to identifying the panelist, a report generator to cause a server to associate the second media data pair and demographic data included in a report by transmitting the report to the server, the demographic data associated with the panelist.

Example 23 includes the apparatus of example 22, wherein the first media data pair includes first data and second data, the first data including an identification of the streaming media, the second data including a timestamp corresponding to an access of the streaming media.

Example 24 includes the apparatus of example 22, further including the panelist identifier to identify a candidate panelist based on a match of the first media data pair and the second media data pair, a probability determiner to determine a probability that the candidate panelist is associated with the first media data pair, and the panelist identifier to, in response to a determination that the probability satisfies a threshold, identify the candidate panelist as the panelist.

Example 25 includes the apparatus of example 22, wherein the first media data pair is associated with a third media data pair included in the first media presentation data, and further including the data identifier to in response to a query of a database with the first media data pair, determine whether the first media data pair matches the second media data pair, the database to store the second media presentation data, and in response to a determination that the first media data pair matches the second media data pair, identify a fourth media data pair associated with the second media data pair, the fourth media data pair stored in the database, and a probability determiner to, in response to a determination that the third media data pair matches the fourth media data pair, determine a probability that the panelist is associated with at least one of the first media data pair or the third media data pair based on at least one of (i) a first match of the first media data pair and the second media data pair or (ii) a second match of the third media data pair and the fourth media data pair.

Example 26 includes the apparatus of example 25, wherein the panelist is a candidate panelist, and the panelist identifier is to identify the candidate panelist as a non-panelist in response to a determination that the second media data pair does not match the fourth media data pair.

Example 27 includes the apparatus of example 22, wherein at least one of the first media presentation data or the second media presentation data is obtained from a streaming device, the streaming device associated with at least one of a desktop computer, a laptop computer, a smartphone, a tablet, or a television.

Example 28 includes the apparatus of example 22, wherein the streaming media is accessed from at least one of a desktop computer, a laptop computer, a smartphone, a tablet, or a television through a streaming meter.

Example 29 includes a method comprising extracting a first media data pair from first media presentation data obtained from a media provider, the first media presentation data generated in response to first media presentation devices accessing streaming media provided by the media provider, identifying a second media data pair in second media presentation data based on a comparison of the first media data pair and the second media presentation data, the second media data pair generated in response to a meter accessing streaming data associated with a second media presentation device accessing the streaming media, identifying a panelist associated with the second media data pair, and in response to identifying the panelist, causing a server to associate the second media data pair and demographic data included in a report by transmitting the report to the server, the demographic data associated with the panelist.

Example 30 includes the method of example 29, wherein the first media data pair includes first data and second data, the first data including an identification of the streaming media, the second data including a timestamp corresponding to an access of the streaming media.

Example 31 includes the method of example 29, further including identifying a candidate panelist based on a match of the first media data pair and the second media data pair, determining a probability that the candidate panelist is associated with the first media data pair, and in response to determining that the probability satisfies a threshold, identifying the candidate panelist as the panelist.

Example 32 includes the method of example 29, wherein the first media data pair is associated with a third media data pair included in the first media presentation data, and further including in response to querying a database with the first media data pair, determining whether the first media data pair matches the second media data pair, the database storing the second media presentation data, in response to determining that the first media data pair matches the second media data pair, identifying a fourth media data pair associated with the second media data pair, the fourth media data pair stored in the database, and in response to determining that the third media data pair matches the fourth media data pair, determining a probability that the panelist is associated with at least one of the first media data pair or the third media data pair based on at least one of (i) a first match of the first media data pair and the second media data pair or (ii) a second match of the third media data pair and the fourth media data pair.

Example 33 includes the method of example 32, wherein the panelist is a candidate panelist, and further including identifying the candidate panelist as a non-panelist in response to determining that the second media data pair does not match the fourth media data pair.

Example 34 includes the method of example 29, wherein at least one of the first media presentation data or the second media presentation data is obtained from a streaming device, the streaming device associated with at least one of a desktop computer, a laptop computer, a smartphone, a tablet, or a television.

Example 35 includes the method of example 29, wherein the streaming media is accessed from at least one of a desktop computer, a laptop computer, a smartphone, a tablet, or a television through a streaming meter.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An audience measurement computing system apparatus comprising:
   at least one processor; and
   memory having stored therein computer readable instructions that, when executed by the at least one processor, cause the audience measurement computing system to:
     obtain a first set of media data pairs from a media provider, the first set of media data pairs corresponding to respective times at which a first media presentation device accessed streaming media provided by the media provider within first media presentation data of the media provider;
     identify a second set of media data pairs in second media presentation data of candidate common panelist households based on a comparison of the first set of media data pairs and the second media presentation data, the second set of media data pairs generated by a meter accessing streaming data associated with a given candidate common panelist household accessing the streaming media;
     determine an extent of correspondence between the first set of media data pairs and the second set of media data pairs;
     based on the extent of correspondence between the first set of media data pairs and the second set of media data pairs satisfying a criteria, identify the given candidate common panelist household associated with the second set of media data pairs as a common panelist household corresponding to the first media presentation device within the first media presentation data of the media provider; and based on to identifying the given candidate common panelist household, generate a report associating demographic data associated with the common panelist household with the streaming media.

2. The audience measurement computing system of claim 1, wherein the first set of media data pairs includes multiple media data pairs, each media pair including an identification of the streaming media and a timestamp corresponding to an access of the streaming media.

3. The audience measurement computing system of claim 1, wherein the computer readable instructions further cause, when executed by the at least one processor, the audience measurement computing system to:
   determine the extent of correspondence between the first set of media data pairs and the second set of media data pairs by determining a probability that the given candidate common panelist household is associated with the first set of media data pairs; and
   determine the extent of correspondence between the first set of media data pairs and the second set of media data pairs satisfies the criteria by determining that the probability satisfies a threshold.

4. The audience measurement computing system of claim 1, wherein the computer readable instructions further cause, when executed by the at least one processor, the audience measurement computing system is to:
   in response to a query of the second media presentation data based on a first one of the first set of media data pairs, make a determination that the first one of the first set of media data pairs matches at least one of the second set of media data pairs;
   in response to making the determination that the first one of the first set of media data pairs matches at least one of the second set of media data pairs, identify an additional media data pair of the second set of media data pairs;
   make a determination that a second one of the first set of media pairs matches the additional media data pair of the second set of media data pairs; and
   in response to making the determination that the second one of the first set of media data pairs matches the additional media data pair of the second set of fourth media data pairs, determine the extent of correspondence.

5. The audience measurement computing system of claim 1, wherein the computer readable instructions further cause, when executed by the at least one processor, the audience measurement computing system to identify an additional candidate common panelist household as a non-panelist household in response to a determination that an additional set of media data pairs corresponding to the additional candidate common panelist household obtained from the media provider does not match the second set of media data pairs.

6. The audience measurement computing system of claim 1, wherein the second media presentation data is obtained from a streaming device, the streaming device associated with at least one of a desktop computer, a laptop computer, a smartphone, a tablet, or a television.

7. The audience measurement computing system of claim 1, wherein the streaming media is accessed via a television.

8. A method comprising:
   obtaining a first set of media data pairs from a media provider, the first set of media data pairs corresponding to respective times at which a first media presentation device accessed streaming media provided by the media provider within first media presentation data of the media provider;
   identifying a second set of media data pairs in second media presentation data of candidate common panelist households based on a comparison of the first set of media data pairs and the second media presentation data, the second set of media data pairs generated by a meter accessing streaming data associated with a given candidate common panelist household accessing the streaming media;
   determining an extent of correspondence between the first set of media data pairs and the second set of media data pairs;
   based on the extent of correspondence between the first set of media data pairs and the second set of media data pairs satisfying a criteria, identifying the given candidate common panelist household associated with the second set of media data pairs as a common panelist household corresponding to the first media presentation device within the first media presentation data of the media provider; and
   based on identifying the given candidate common panelist household, generating a report associating demographic data associated with the given candidate common panelist household with the streaming media.

9. The method of claim 8, wherein the first set of media data pairs includes multiple media data pairs, each media pair including an identification of the streaming media and a timestamp corresponding to an access of the streaming media.

10. The method of claim 8, further including:
    determining the extent of correspondence between the first set of media data pairs and the second set of media data pairs by determining a probability that the given candidate common panelist household is associated with the first set of media data pairs; and
    determining the extent of correspondence between the first set of media data pairs and the second set of media data pairs satisfies the criteria by determining that the probability satisfies a threshold.

11. The method of claim 8, further including:
    in response to a query of the second media presentation data based on a first one of the first set of media data pairs, making a determination that the first one of the first set of media data pairs matches at least one of the second media data pairs;
    in response to making the determination that the first one of the first set of media data pairs matches at least one of the second set of media data pairs, identifying an additional media data pair of the second set of media data pairs;
    making a determination that a second one of the first set of media pairs matches the additional media data pair of the second set of media data pairs; and
    in response to making the determination that the second one of the first set of media data pairs matches the additional media data pair of the second set of media data pairs, determining the extent of correspondence.

12. The method of claim 8, further including identifying an additional candidate common panelist household as a non-panelist household in response to a determination that an additional set of media data pairs corresponding to the additional candidate common panelist household obtained from the media provider does not match the second set of media data pairs.

13. The method of claim 8, wherein the second media presentation data is obtained from a streaming device, the streaming device associated with at least one of a desktop computer, a laptop computer, a smartphone, a tablet, or a television.

14. The method of claim 8, wherein the streaming media is accessed via a television.

15. A non-transitory computer readable medium comprising instructions that, when executed by at least one processor, cause at least:
   obtaining a first set of media data pairs from a media provider, the first set of media data pairs corresponding to respective times at which a first media presentation device accessed streaming media provided by the media provider within first media presentation data of the media provider;
   identifying a second set of media data pairs in second media presentation data of candidate common panelist households based on a comparison of the first set of media data pairs and the second media presentation data, the second set of media data pairs generated by a meter accessing streaming data associated with a given candidate common panelist household accessing the streaming media;
   determining an extent of correspondence between the first set of media data pairs and the second set of media data pairs;
   based on the extent of correspondence between the first set of media data pairs and the second set of media data pairs satisfying a criteria, identifying the given candidate common panelist household associated with the second set of media data pairs as a common panelist household corresponding to the first media presentation device within the first media presentation data of the media provider; and
   based on identifying the given candidate common panelist household, generating a report associating demographic data associated with the given candidate common panelist household with the streaming.

16. The non-transitory computer readable medium of claim 15, wherein the first set of media data pairs includes multiple media data pairs, each media pair including an identification of the streaming media and a timestamp corresponding to an access of the streaming media.

17. The non-transitory computer readable medium of claim 15, wherein the instructions, when executed by the at least one processor, further cause:
   determining the extent of correspondence between the first set of media data pairs and the second set of media data pairs by determining a probability that the given candidate common panelist household is associated with the first set of media data pairs; and
   determining the extent of correspondence between the first set of media data pairs and the second set of media data pairs satisfies the criteria by determining that the probability satisfies a threshold.

18. The non-transitory computer readable medium of claim 15, wherein the instructions, when executed by the at least one processor, further cause:
   in response to a query of the second media presentation data based on a first one of the first set of media data pairs, making a determination that the first one of the first set of media data pairs matches at least one of the second media data pairs;
   in response to making the determination that the first one of the first set of media data pairs matches at least one of the second set of media data pairs, identifying an additional media data pair of the second set of media data pairs;
   making a determination that a second one of the first set of media pairs matches the additional media data pair of the second set of media data pairs; and
   in response to making the determination that the second one of the first set of media data pairs matches the additional media data pair of the second set of media data pairs, determining the extent of correspondence.

19. The non-transitory computer readable medium of claim 15, wherein the instructions, when executed by the at least one processor, further cause identifying an additional candidate common panelist household as a non-panelist household in response to a determination that an additional set of media data pairs corresponding to the additional candidate common panelist household obtained from the media provider does not match the second set of media data pairs.

20. The non-transitory computer readable medium of claim 15, wherein the second media presentation data is obtained from a streaming device, the streaming device associated with at least one of a desktop computer, a laptop computer, a smartphone, a tablet, or a television.

* * * * *